United States Patent
Yamashita

(10) Patent No.: US 9,901,819 B2
(45) Date of Patent: Feb. 27, 2018

(54) STORAGE MEDIUM HAVING STORED THEREIN VIBRATION SIGNAL GENERATION PROGRAM, VIBRATION GENERATION APPARATUS, VIBRATION GENERATION SYSTEM, AND VIBRATION SIGNAL GENERATION METHOD

(71) Applicant: NINTENDO CO., LTD., Kyoto (JP)

(72) Inventor: Kei Yamashita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 115 days.

(21) Appl. No.: 14/995,494

(22) Filed: Jan. 14, 2016

(65) Prior Publication Data

US 2016/0214007 A1 Jul. 28, 2016

(30) Foreign Application Priority Data

Jan. 27, 2015 (JP) .................... 2015-013041

(51) Int. Cl.
*G06F 17/00* (2006.01)
*A63F 13/285* (2014.01)
*A63F 13/92* (2014.01)
*A63F 13/812* (2014.01)
*A63F 13/44* (2014.01)

(52) U.S. Cl.
CPC .......... *A63F 13/285* (2014.09); *A63F 13/812* (2014.09); *A63F 13/92* (2014.09); *A63F 13/44* (2014.09)

(58) Field of Classification Search
USPC ...................................... 463/30–33
See application file for complete search history.

(56) References Cited

U.S. PATENT DOCUMENTS

2011/0152729 A1* 6/2011 Oohashi ............... A61M 21/02
                                                            601/2
2016/0345107 A1* 11/2016 Van Dijk ............ H04R 25/505

FOREIGN PATENT DOCUMENTS

JP 2002-191864 7/2002

* cited by examiner

*Primary Examiner* — Ronald Laneau
(74) *Attorney, Agent, or Firm* — Nixon & Vanderhye PC

(57) ABSTRACT

A predetermined parameter is acquired during execution of an application, and a predetermined algorithm indicating at least timing and intensity for generating a vibration is set by dynamically changing the predetermined algorithm in accordance with the parameter. Then, a vibration signal is generated using a material for a vibration or a sound and the algorithm, or using a filter capable of generating the material and the algorithm.

29 Claims, 15 Drawing Sheets

FIG. 4
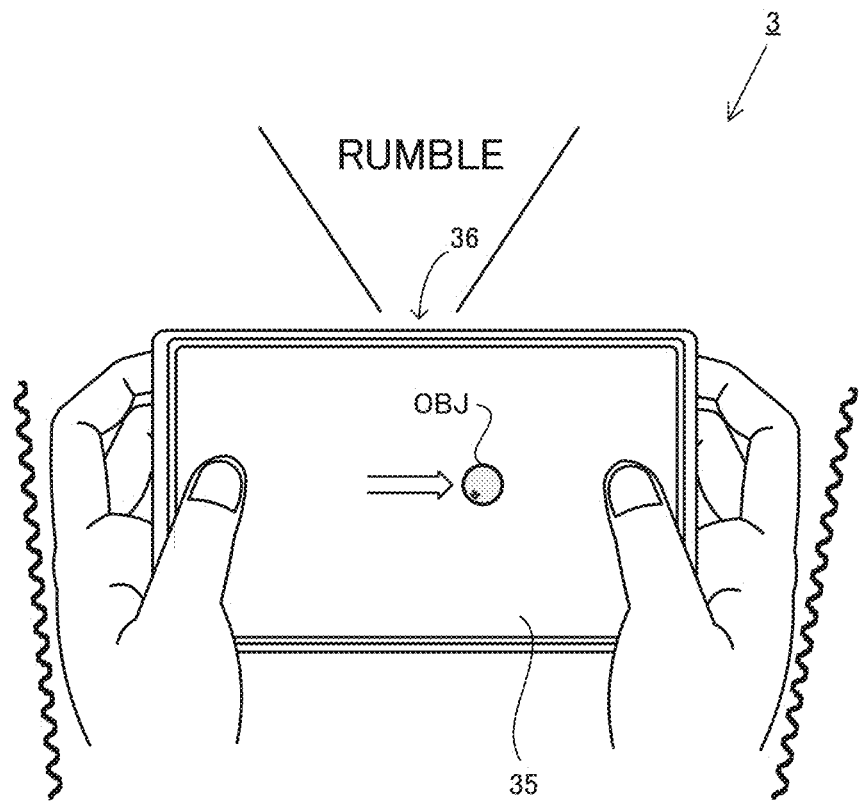
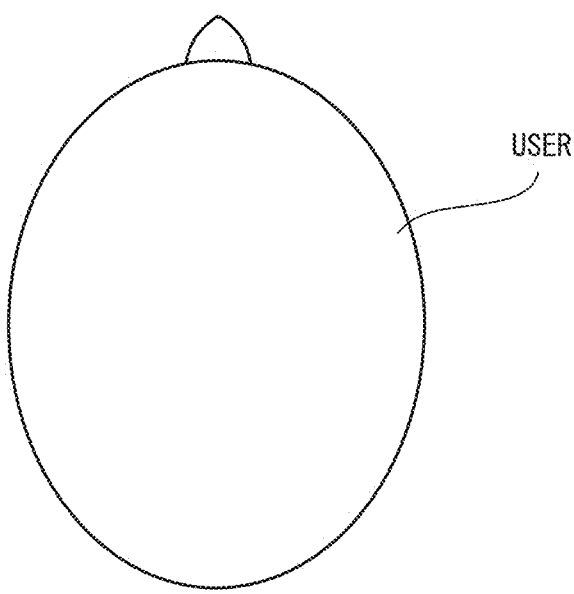

FIG. 9

| | PHYSICAL PARAMETERS OF SPHERE | | | PHYSICAL PARAMETERS OF BOARD SURFACE | |
|---|---|---|---|---|---|
| | RADIUS | MASS | SPEED | UNEVENNESS SIZE OF SURFACE | FRACTAL NATURE OF UNEVENNESS OF SURFACE |
| $\beta_{\Delta T}$ | | | + | | |
| $\beta_A$ | − | | + | | − |
| $\min_{\Delta T}$ | − | | + | + | |
| $\max_{\Delta T}$ | − | − | + | + | + |
| $\min_A$ | | + | | | |
| $\max_A$ | | + | + | | + |
| $\min_w$ | | + | − | + | |
| $\max_w$ | | + | − | + | |

+ : POSITIVE CORRELATION
− : NEGATIVE CORRELATION
BLANK : NO CORRELATION

| | $\alpha_G$ | $\alpha_R$ | $S_G$ | $S_R$ |
|---|---|---|---|---|
| WOOD | 3.0 | 0.0004 | 0.85 | 0.05 |
| GLASS | 2.5 | 0.00015 | 2.4 | 0.2 |
| METAL | 0.6 | 0.0002 | 0.5 | 0.1 |

STORAGE MEDIUM HAVING STORED THEREIN VIBRATION SIGNAL GENERATION PROGRAM, VIBRATION GENERATION APPARATUS, VIBRATION GENERATION SYSTEM, AND VIBRATION SIGNAL GENERATION METHOD

CROSS REFERENCE TO RELATED APPLICATION

The disclosure of Japanese Patent Application No. 2015-013041, filed on Jan. 27, 2015, is incorporated herein by reference.

FIELD

The technology shown here relates to a storage medium having stored therein a vibration signal generation program, a vibration generation apparatus, a vibration generation system, and a vibration signal generation method, and in particular, relates to a storage medium having stored therein a vibration signal generation program for, for example, generating a vibration to be imparted to a user, a vibration generation apparatus, a vibration generation system, and a vibration signal generation method for, for example, generating a vibration to be imparted to a user.

BACKGROUND AND SUMMARY

Conventionally, a game apparatus for imparting vibrations to the main body of the apparatus is known. For example, the game apparatus vibrates in a vibration pattern determined in advance, thereby transmitting vibrations to the fingers and the hands of a user holding the game apparatus.

In the game apparatus, however, the vibrations to be transmitted to the fingers and the hands of the user are poor in variety.

Therefore, it is an object of an exemplary embodiment to provide a vibration signal generation program, a vibration generation apparatus, a vibration generation system, and a vibration signal generation method that are capable of generating a vibration signal for outputting a vibration rich in variety.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein a vibration signal generation program according to the exemplary embodiment, the vibration signal generation program is executed by a computer included in a vibration signal generation apparatus for generating a vibration signal in accordance with execution of an application. The vibration signal generation program causing the computer to execute: acquiring a predetermined parameter during the execution of the application; setting a predetermined algorithm indicating at least timing and intensity for generating a vibration, by dynamically changing the predetermined algorithm in accordance with the parameter acquired in the acquisition of the predetermined parameter; and generating a vibration signal using a material for a vibration or a sound and the algorithm set in the setting of the predetermined algorithm, or using a filter capable of generating the material and the algorithm set in the setting of the predetermined algorithm.

Based on the above, it is possible to generate a vibration signal for outputting a vibration rich in variety.

In addition, the vibration signal generation program may further cause the computer to execute generating a sound signal using the same algorithm set in the setting of the predetermined algorithm.

Based on the above, it is possible to easily match vibration generation timing and sound generation timing. This reduces the processing load for generating a vibration signal and a sound signal.

In addition, the vibration signal generation program may further cause the computer to execute approximately simultaneously outputting a vibration indicating the vibration signal generated in the generation of the vibration signal and a sound indicating the sound signal generated in the generation of the sound signal.

Based on the above, it is possible to easily match the timing when a vibration is performed by the generated vibration signal and the timing when a sound based on the generated sound signal is output.

In addition, in the generation of the vibration signal, the vibration signal may be generated using a first material for a vibration or a sound and the algorithm set in the setting of the predetermined algorithm, or using a filter capable of generating the first material and the algorithm set in the setting of the predetermined algorithm. In the generation of the sound signal, the sound signal may be generated using a second material for a sound different from the first material and the same algorithm, or using a filter capable of generating the second material and the same algorithm.

Based on the above, a material for generating a vibration signal and a material for generating a sound signal are used, whereby it is possible to output a vibration and a sound according to the characteristics of the materials.

In addition, in the generation of the vibration signal, the vibration signal may be generated using the filter capable of generating the material and the algorithm set in the setting of the predetermined algorithm. In the generation of the sound signal, the sound signal may be generated using the material and the same algorithm.

Based on the above, a vibration signal is generated based on the combination of a filter and an algorithm, whereby it is not necessary to prepare a plurality of materials for generating a vibration. This facilitates a vibration signal generation process. Further, a sound signal is generated based on the combination of a material and the algorithm, whereby it is also possible to use a material prepared by recording. This makes it possible to output a realistic sound.

In addition, the vibration signal generation program may further cause the computer to execute generating a sound signal using the same filter capable of generating the material.

Based on the above, the processing load for generating a vibration signal and a sound signal is reduced.

In addition, in the acquisition of the predetermined parameter, while an application for displaying a predetermined object on a display screen by placing the predetermined object in a virtual world is executed, a parameter regarding the object may be acquired. In the setting of the predetermined algorithm, the predetermined algorithm may be changed in accordance with the parameter regarding the object.

Based on the above, it is possible to generate a vibration signal for outputting a vibration corresponding to an object placed in a virtual world.

In addition, in the acquisition of the predetermined parameter, based on a physical simulation when the object is placed in the virtual world, the parameter regarding the object may be acquired.

Based on the above, it is possible to generate a vibration signal for outputting a vibration corresponding to the physical phenomena of the object in the virtual world.

In addition, in the acquisition of the predetermined parameter, a parameter representing a vibration generated by the object in the virtual world may be acquired as the parameter regarding the object.

Based on the above, it is possible to generate a vibration signal for outputting a vibration representing a vibration generated by the object in the virtual world.

In addition, in the acquisition of the predetermined parameter, based on a situation of the object in the virtual world, the parameter regarding the object may be acquired.

Based on the above, it is possible to generate a vibration signal for outputting a vibration corresponding to the situation of the object in the virtual world.

In addition, in the generation of the vibration signal, the vibration signal may be generated using materials for a plurality of vibrations or materials for a plurality of sounds and the algorithm set in the setting of the predetermined algorithm.

Based on the above, a plurality of materials are used, whereby it is possible to generate a vibration signal for outputting a more realistic vibration.

In addition, the filter may include at least one biquad filter.

Based on the above, it is possible to easily form a filter for use in generating a vibration signal.

In addition, the vibration signal generation program may further cause the computer to execute changing a parameter for the filter in accordance with the parameter acquired in the acquisition of the predetermined parameter.

Based on the above, it is possible to change a vibration signal in real time in accordance with the execution of a predetermined application.

In addition, the generation of the vibration signal may include generation of the material in real time in accordance with a result of the execution of the application.

Based on the above, it is possible to generate a vibration signal for outputting a vibration rich in variety without being limited by the number of materials. Thus, it is not necessary to prepare a material in advance. This makes it possible to reduce preparation work for generating a vibration.

In addition, in the setting of the predetermined algorithm, the algorithm may be set by, in accordance with the parameter acquired in the acquisition of the predetermined parameter, calculating at least one of intensity of each vibration, a time interval for generating each vibration, a time width of generation of each vibration, and randomness of each vibration.

Based on the above, it is possible to generate a vibration signal for outputting a vibration rich in variety.

In addition, in the acquisition of the predetermined parameter, a first parameter may be able to be acquired during execution of a first application, and a second parameter may be able to be acquired during execution of a second application different from the first application. In the setting of the predetermined algorithm, if the first parameter and the second parameter acquired in the acquisition of the predetermined parameter are the same as each other, the same algorithm may be set.

Based on the above, even if an application to be executed is different, but if a parameter to be acquired in accordance with the execution of the application is the same, this can result in imparting the same vibration to a user. This is useful as a vibration waveform generation technique that can be commonly used for a plurality of applications.

In addition, in the setting of the predetermined algorithm, a non-loop algorithm may be set in accordance with the parameter acquired in the acquisition of the predetermined parameter. In the generation of the vibration signal, a non-loop vibration signal may be generated using the non-loop algorithm.

Based on the above, it is possible to generate a vibration signal for outputting a vibration of which the feel is unlikely to be monotonous.

In addition, the material may be waveform data of a band less than or equal to an upper limit frequency at which a user can recognize a vibration.

Based on the above, it is possible to generate a vibration signal for outputting a realistic vibration.

In addition, the material may include waveform data of a frequency range in which the user cannot hear a sound.

Based on the above, it is possible to generate a vibration signal for outputting a realistic vibration.

In addition, the filter may include a set of a plurality of filters in which a characteristic frequency less than or equal to an upper limit frequency at which a user can recognize a vibration is set.

Based on the above, it is possible, using a limited number of filters, to generate a vibration signal for outputting a realistic vibration.

In addition, the set of filters may include a filter in which a characteristic frequency belongs to a frequency range in which the user cannot hear a sound.

Based on the above, it is possible, using a limited number of filters, to generate a vibration signal for outputting a realistic vibration.

In addition, in another exemplary configuration of a non-transitory computer-readable storage medium having stored therein a vibration signal generation program according to the exemplary embodiment, the vibration signal generation program is executed by a computer included in a vibration signal generation apparatus for generating a vibration signal. The vibration signal generation program causes the computer to execute: setting a predetermined algorithm indicating at least timing and intensity for generating a vibration; generating a vibration signal using a material for a vibration or a sound and the algorithm set in the setting of the predetermined algorithm, or using a filter capable of generating the material and the algorithm set in the setting of the predetermined algorithm; and generating a sound signal using the same algorithm set in the setting of the predetermined algorithm.

Based on the above, it is possible to generate a vibration signal and a sound signal capable of easily matching vibration generation timing and sound generation timing. This reduces the processing load for generating a vibration signal and a sound signal.

In addition, the exemplary embodiment may be carried out in the forms of a vibration signal generation apparatus, a vibration signal generation system, and a vibration signal generation method.

According to the exemplary embodiment, it is possible to generate a vibration signal for outputting a vibration rich in variety.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 is a diagram showing a non-limiting example where the main body of the information processing apparatus 3 vibrates and simultaneously, a sound is output when a virtual object OBJ displayed on a display screen of a display section 35 moves;

FIG. 9 is a diagram illustrating non-limiting examples of physical parameters for use in setting an intensity arrangement sequence and non-limiting examples of the correlations between the physical parameters;

DETAILED DESCRIPTION OF NON-LIMITING EXAMPLE EMBODIMENTS

With reference to the drawings, a vibration signal generation apparatus (a vibration signal generation system) for executing a vibration signal generation program according to an exemplary embodiment is described. While the vibration signal generation program according to the exemplary embodiment can be applied by being executed by any computer system, a mobile information processing apparatus 3 (a tablet terminal) is used as an example of the vibration signal generation apparatus (the vibration signal generation system), and the vibration signal generation program according to the exemplary embodiment is described using a vibration signal generation program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of the information processing apparatus 3.

Figure 1:
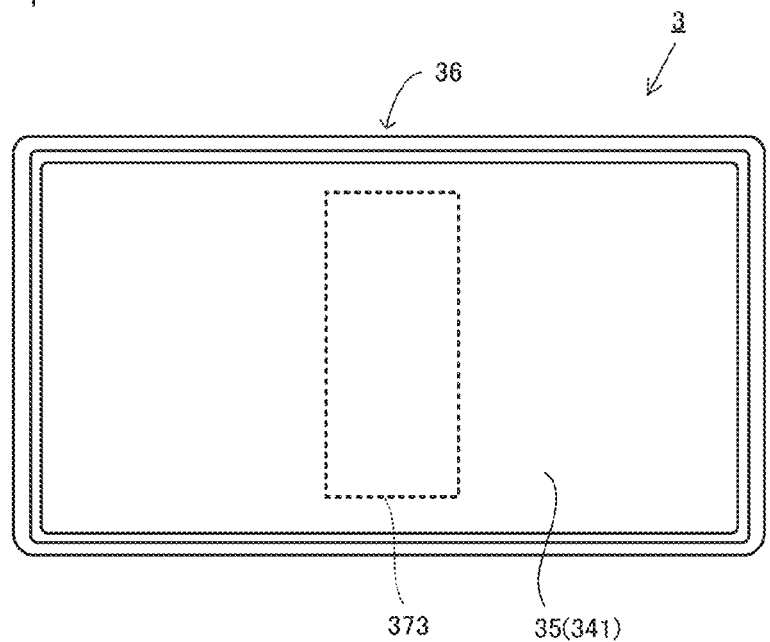
FIG. 1 is a plan view of a non-limiting example of the external appearance of an information processing apparatus 3 according to an exemplary embodiment.

In FIG. 1, the information processing apparatus 3 includes a display section 35, a sound output section 36, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the front surface, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes a loudspeaker for outputting a sound, and in the example shown in FIG. 1, includes a loudspeaker provided on the upper side surface or the back surface of the information processing apparatus 3. The sound output section 36 performs D/A conversion on a sound signal (a sound control signal) output from a control section 31 described later, thereby generating an analog sound signal. Then, the sound output section 36 outputs the analog sound signal to the loudspeaker, thereby outputting a sound.

The actuator 373 is a vibration actuator (a vibrator) for imparting a predetermined vibration to the main body of the information processing apparatus 3 and is included in a vibration generation section 37 described later. In the example shown in FIG. 1, the actuator 373 is provided near the center of the inside of the main body of the information processing apparatus 3. Specifically, as indicated by a dashed line area in FIG. 1, the actuator 373 is provided in a central portion of the display section 35, which is a position between the left hand and the right hand of the user when holding a left end portion of the information processing apparatus 3 in the left hand and holding a right end portion of the information processing apparatus 3 in the right hand. Further, the vibration generation section 37 performs D/A conversion on a vibration control signal output from the control section 31 described later, thereby generating an analog vibration signal. Then, the vibration generation section 37 outputs a driving signal obtained by amplifying the analog vibration signal to the actuator 373, thereby driving the actuator 373.

It should be noted that as is clear from FIG. 1, the display screen of the display section 35 and the sound output section 36, which are provided in the information processing apparatus 3, are placed at positions close to each other. The display screen of the display section 35 and the actuator 373 are placed at positions close to each other. Further, the sound output section 36 and the actuator 373 are placed at positions close to each other, but are different units disposed at different positions. Consequently, it is possible to include a unit dedicated to outputting a vibration and a unit dedicated to outputting a sound. Thus, it is possible to output a vibration and a sound more accurately than when a general-purpose unit is shared. It should be noted that a module into which a unit for outputting a vibration and a unit for outputting a sound are combined and integrated may be provided in the information processing apparatus 3.

Figure 2:
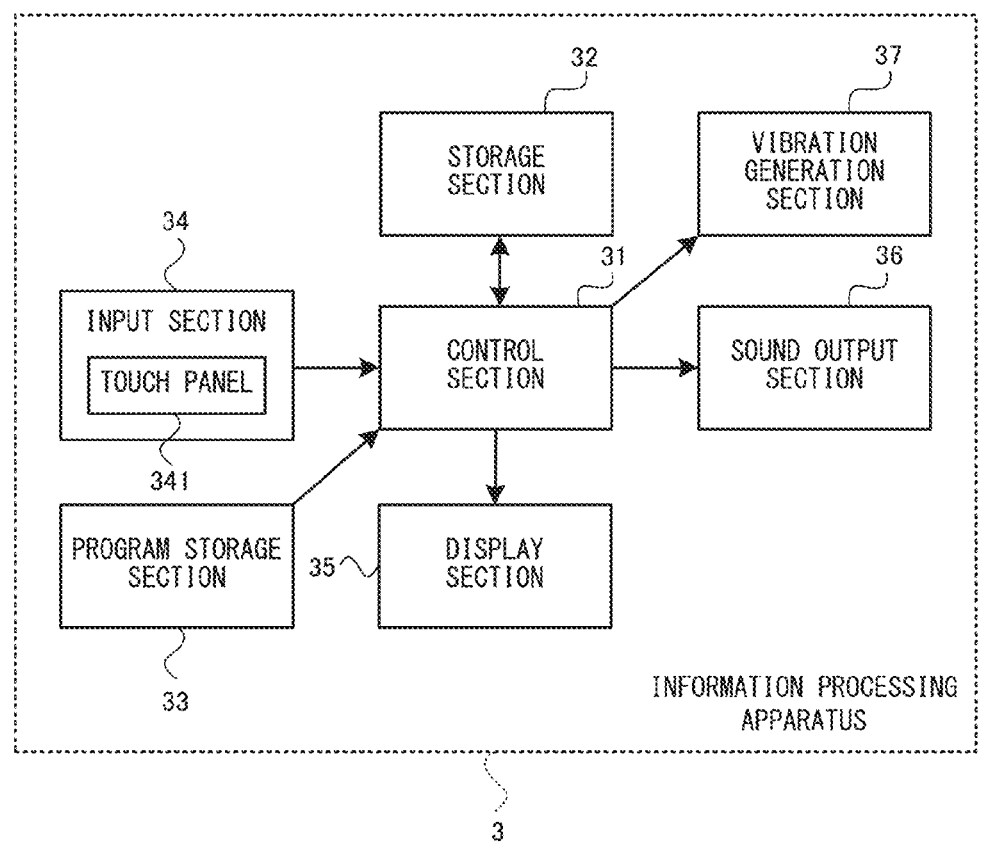
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, and a program storage section 33 in addition to the input section 34, the display section 35, the sound output section 36, and the vibration generation section 37, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, a sound control signal (e.g., a digital sound signal) for controlling a sound to be output from the loudspeaker. Further, as an example of the various types of information processing, the control section 31 generates, based on an image to be displayed on the display section 35 or the like, a vibration control signal (e.g., a digital vibration signal) for controlling the vibration of the actuator 373 and outputs the vibration control signal to the vibration generation section 37.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

Figure 3:
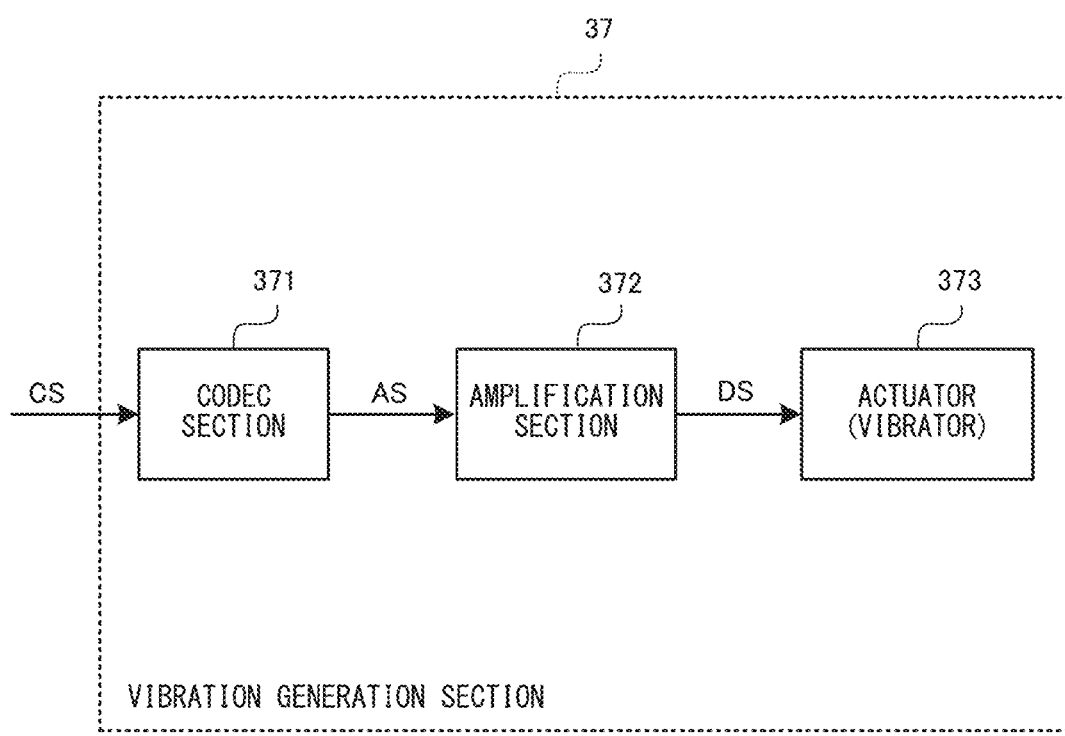
FIG. 3 is a block diagram showing a non-limiting example of the configuration of a vibration generation section 37.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the actuator (vibrator) 373.

The codec section 371 acquires a vibration control signal output from the control section 31 and performs a predetermined decoding process on the vibration control signal, thereby generating an analog vibration signal. Then, the codec section 371 outputs the analog vibration signal to the amplification section 372. For example, to generate a vibration in the actuator 373, the control section 31 outputs a vibration control signal (e.g., a vibration control signal CS) for controlling the vibration to be generated. In this case, the codec section 371 decodes the vibration control signal output from the control section 31, thereby generating an analog vibration signal (e.g., an analog vibration signal AS) for generating a vibration in the actuator 373. Then, the codec section 371 outputs the analog vibration signal to the amplification section 372.

The amplification section 372 amplifies the analog vibration signal output from the codec section 371, thereby generating a driving signal for driving the actuator 373. Then, the amplification section 372 outputs the driving signal to the actuator 373. For example, the amplification section 372 increases changes in the amplitudes of the current and/or the voltage of the analog vibration signal (e.g., the analog vibration signal AS) output from the codec section 371, thereby generating a driving signal (e.g., a driving signal DS). Then, the amplification section 372 outputs the driving signal to the actuator 373.

The actuator 373 is driven in accordance with the driving signal output from the amplification section 372, thereby imparting a vibration corresponding to the driving signal to the main body of the information processing apparatus 3. For example, the actuator 373 is a linear vibration actuator capable of vibrating at any frequency, and as shown in FIG. 1, is provided in the center of the display screen of the display section 35. Here, the method of the actuator 373 imparting a vibration to the main body of the information processing apparatus 3 may be any method. For example, the actuator 373 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. If the driving signal to be output from the amplification section 372 is generated in accordance with the method of the actuator 373 generating a vibration, an actuator using any method can impart various vibrations to the user of the information processing apparatus 3.

It should be noted that in the above description, an example has been used where a driving signal for driving the actuator 373 is generated by amplifying the analog vibration signal generated by the codec section 371. Alternatively, the signal output from the codec section 371 to the amplification section 372 may be a digital signal. For example, if the actuator 373 is driven by pulse width modulation (PWM) control, the codec section 371 may generate a pulse signal for turning on and off the actuator 373. In this case, the signal output from the codec section 371 to the amplification section 372 is a digital vibration signal for controlling the driving of the actuator 373 using pulse waves. Consequently, the amplification section 372 amplifies the digital vibration signal.

Figure 5:
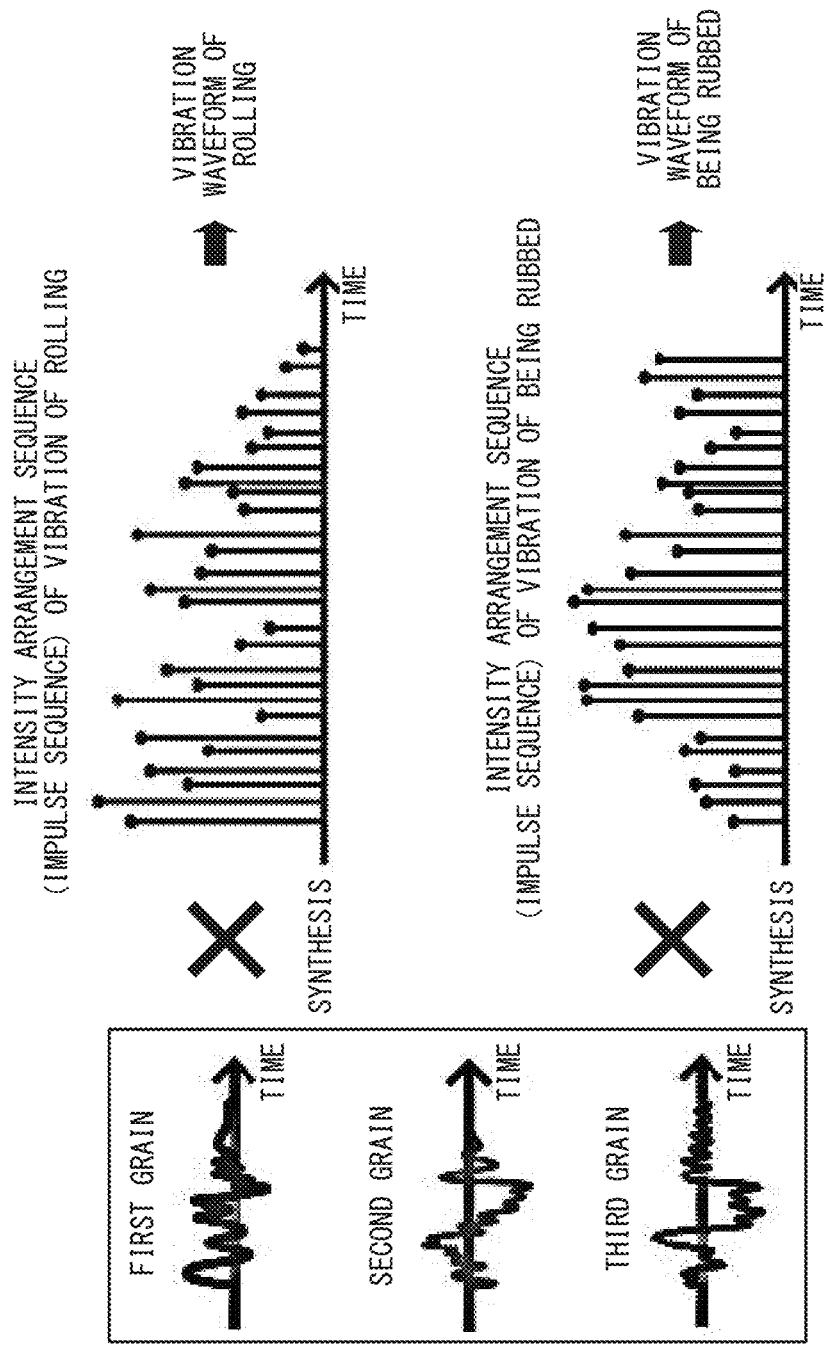
FIG. 5 is a diagram illustrating a non-limiting example of the process of generating a vibration signal (a vibration waveform) for vibrating the main body of the information processing apparatus 3.
Figure 6:
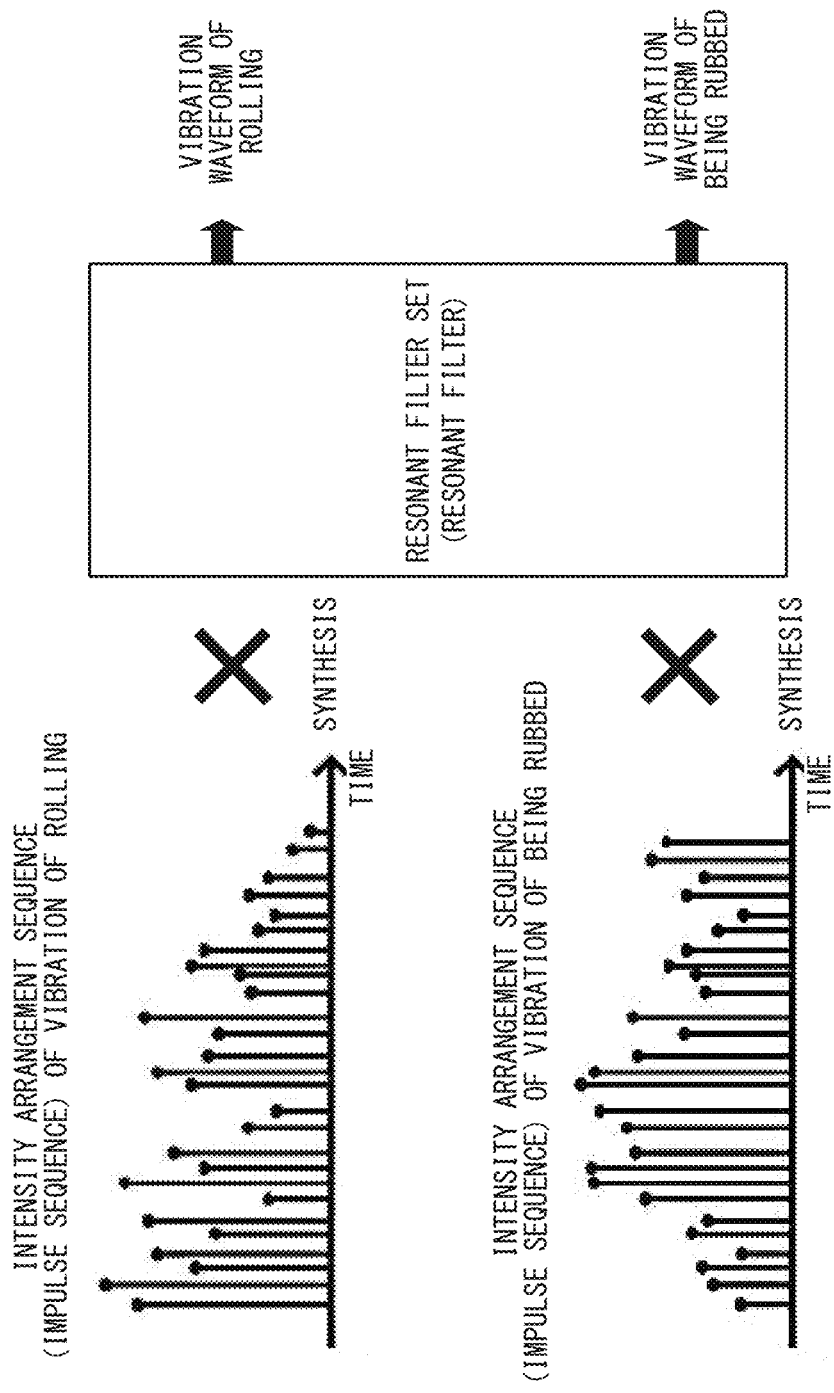
FIG. 6 is a diagram illustrating another non-limiting example of the process of generating a vibration signal (a vibration waveform) for vibrating the main body of the information processing apparatus 3.

Next, with reference to FIGS. 4 to 6, a description is given of an overview of the processing performed by the information processing apparatus 3, before the description of specific processing performed by the information processing apparatus 3. In the following descriptions, the process of performing a game where a virtual object OBJ moves in the display screen of the display section 35 is used as an example of the information processing performed by the information processing apparatus 3. It should be noted that FIG. 4 is a diagram showing an example where the main body of the information processing apparatus 3 vibrates and simultaneously, a sound is output when a virtual object OBJ displayed on the display screen of the display section 35 moves. FIG. 5 is a diagram illustrating an example of the process of generating a vibration signal (a vibration waveform) for vibrating the main body of the information processing apparatus 3. FIG. 6 is a diagram illustrating another example of the process of generating a vibration signal (a vibration waveform) for vibrating the main body of the information processing apparatus 3.

In the example shown in FIG. 4, a virtual object OBJ moving in a virtual space is displayed on the display screen of the display section 35. The virtual object OBJ is displayed on the display screen of the display section 35 so as to move in the virtual space in accordance with a user operation or automatically. Specifically, the virtual object OBJ is a sphere that moves while rolling on a board surface installed in the virtual space.

In accordance with the fact that the virtual object OBJ moves while rolling on the board surface in the virtual space, the information processing apparatus 3 outputs a sound, and simultaneously, the main body of the information processing apparatus 3 vibrates. For example, the loudspeaker (the sound output section 36) provided in the main body of the information processing apparatus 3 outputs a sound such that the virtual object OBJ displayed on the display screen of the display section 35 is the sound source. Further, the actuator 373 provided in the main body of the information processing apparatus 3 generates the vibration to occur when the virtual object OBJ moves while rolling. In the exemplary embodiment, in accordance with physical parameters for the movement of the virtual object OBJ and parameters for the material of the sphere as the virtual object OBJ and the material of the board surface, a vibration signal for vibrating the actuator 373 (a vibration control signal for generating a vibration waveform for vibrating the actuator 373) is generated in real time.

Next, with reference to FIG. 5, a description is given of a first example of the process of generating a vibration signal (a vibration waveform). In the vibration signal generation process in the first example, data representing a vibration waveform is not stored in advance, thereby generating a vibration based on the vibration waveform. A vibration waveform corresponding to the execution of a predetermined application (for example, corresponding to the situation of the virtual space based on the execution of a game application) is generated in real time, and the main body of the information processing apparatus 3 is vibrated using the generated vibration waveform. Specifically, in the vibration signal generation process in the first example, a vibration waveform is generated based on a predetermined algorithm. In accordance with the execution of the predetermined application, physical parameters (parameters indicating the material of an object, the spatial position of an object, the speed of an object, the size of an object, the particle density of an object, and the like) are appropriately acquired, the physical parameters are transferred to the algorithm, and a vibration waveform is generated in real time.

In the vibration signal generation process in the first example, a vibration waveform is generated using a sound synthesis method termed granular synthesis, which is being achieved in the field of computer music. Specifically, in this vibration signal generation process, a vibration waveform is used as a grain in use for the granular synthesis, thereby generating in real time a vibration control signal for vibrating the actuator 373. Here, a grain is a material for a vibration waveform for vibrating the actuator 373. A grain alone, however, is a very short vibration waveform that is difficult to recognize as a vibration (typically, a damped sine wave), and a plurality of grains are arranged based on a predetermined rule, whereby it is possible to synthesize a new vibration.

As shown in FIG. 5, it is also possible to prepare a plurality of types of grains (a first grain, a second grain, and a third grain in the example of FIG. 5). As an example, it is also possible to prepare grains in accordance with the materials of objects as vibration sources (if a vibration waveform for use when the sphere rolls on the board surface is generated, the material of the sphere and the material of the board surface). Each grain may be generated by recording a vibration in the real world and a sound in the real world, or may be generated using a filter described later (e.g., a set of biquad filters).

For example, as a rule for arranging these grains, an intensity arrangement sequence (an impulse sequence) is used. The intensity arrangement sequence is a non-loop rule (algorithm) indicating the type of a grain to be arranged, the temporal position of a grain to be arranged, the size (intensity) of a grain to be arranged, and the like. Then, as an example, the intensity arrangement sequence is set by changing it in real time based on physical parameters that can be acquired in accordance with the action of an object moving and the like. For example, even in the case of the same object, the intensity arrangement sequence to be generated when the object rolls and the intensity arrangement sequence to be generated when the object is rubbed are different from each other. Then, even if the same grain (the first grain, the second grain, or the third grain in the example of FIG. 5) is used, the grain is arranged based on the intensity arrangement sequence of a vibration of rolling and is convolved, whereby it is possible to generate a vibration waveform when the object rolls. The grain is arranged based on the intensity arrangement sequence of a vibration of being rubbed and is convolved, whereby it is possible to generate a vibration waveform when the object is rubbed.

It should be noted that regarding a grain for use in this vibration signal generation process, a high-frequency component may be removed from a grain for use in a sound synthesis process. For example, the frequency range that a human being can perceive as a vibration is a relatively low frequency range (less than or equal to 1000 Hz) with respect to the human audible frequency range. Thus, a grain for use in the vibration signal generation process may only need to be a vibration waveform belonging to the frequency range that a human being can perceive as a vibration. Thus, a high-frequency component may be removed from a grain for generating a sound, thereby generating a grain for use in the vibration signal generation process. It should be noted that a grain from which a high-frequency component is removed is used in the vibration signal generation process, whereby it is possible to prevent sound leakage when the actuator 373 is vibrated by the generated vibration control signal. Further, a grain for use in this vibration signal generation process may include waveform data of a frequency range (an inaudible range) that a human being cannot hear. In this case, a grain including an inaudible range is used in the vibration signal generation process, whereby a vibration at a frequency including an inaudible range is imparted to the user also when the actuator 373 is vibrated by the generated vibration control signal.

In addition, as the intensity arrangement sequence for use in this vibration signal generation process, the same intensity arrangement sequence as an intensity arrangement sequence generated in the sound synthesis process may be used. A common intensity arrangement sequence is thus used when a vibration waveform and a sound waveform are simultaneously generated, whereby it is possible to easily match vibration generation timing and sound generation timing. This also makes it possible to reduce the load of the process of generating an intensity arrangement sequence.

Next, with reference to FIG. 6, a description is given of a second example of the process of generating a vibration signal (a vibration waveform). Also in the vibration signal generation process in the second example, data representing a vibration waveform is not stored in advance, thereby generating a vibration based on the vibration waveform. A vibration waveform corresponding to the execution of the predetermined application is generated in real time, and the main body of the information processing apparatus 3 is vibrated using the generated vibration waveform. Specifically, also in the vibration signal generation process in the second example, a vibration waveform is generated based on a predetermined algorithm. In accordance with the execution of the predetermined application, physical parameters are appropriately acquired, the physical parameters are transferred to the algorithm, and a vibration waveform is generated in real time.

In the vibration signal generation process in the second example, a vibration waveform is generated by passing the above intensity arrangement sequence (impulse sequence) through a predetermined resonant filter. Specifically, in this vibration signal generation process, a resonant filter capable of generating a grain for use in a signal in the first example is used. The above intensity arrangement sequence is processed using the resonant filter, thereby generating in real time a vibration control signal for vibrating the actuator 373.

For example, the resonant filter includes a plurality of biquad filters, and each biquad filter is set using a characteristic frequency and an attenuation rate as parameters. Then, the resonant filter for use in this vibration signal generation process is set so that a single impulse is passed through the resonant filter, thereby enabling the generation of a grain for use in a signal in the first example. The above intensity arrangement sequence is passed through such a resonant filter, whereby it is possible to generate in real time a vibration control signal for vibrating the actuator 373, using the same vibration waveform as the vibration waveform generated in the first example.

As shown in FIG. 6, similarly to the first example, also in the vibration signal generation process in the second example, the intensity arrangement sequence to be generated when the object rolls and the intensity arrangement sequence to be generated when the object is rubbed are different from each other. Then, the intensity arrangement sequence of a vibration of rolling is passed through the resonant filter capable of generating a grain used in the first example, whereby it is possible to generate a vibration waveform when the object rolls. The intensity arrangement sequence of a vibration of being rubbed is passed through the resonant filter capable of generating a grain used in the first example, whereby it is possible to generate a vibration waveform when the object is rubbed.

It should be noted that the resonant filter for use in this vibration signal generation process may also be able to generate a grain from which a high-frequency component is removed. Thus, it is possible to use a resonant filter in which the number of filters included in the resonant filter is reduced (e.g., four biquad filters). Thus, the configuration of the resonant filter is simplified, and it is possible to reduce the processing load using the resonant filter. Further, the resonant filter capable of generating a grain from which a high-frequency component is removed is used in the vibration signal generation process, whereby it is possible to prevent sound leakage when the actuator 373 is vibrated using the generated vibration control signal.

Figure 7:
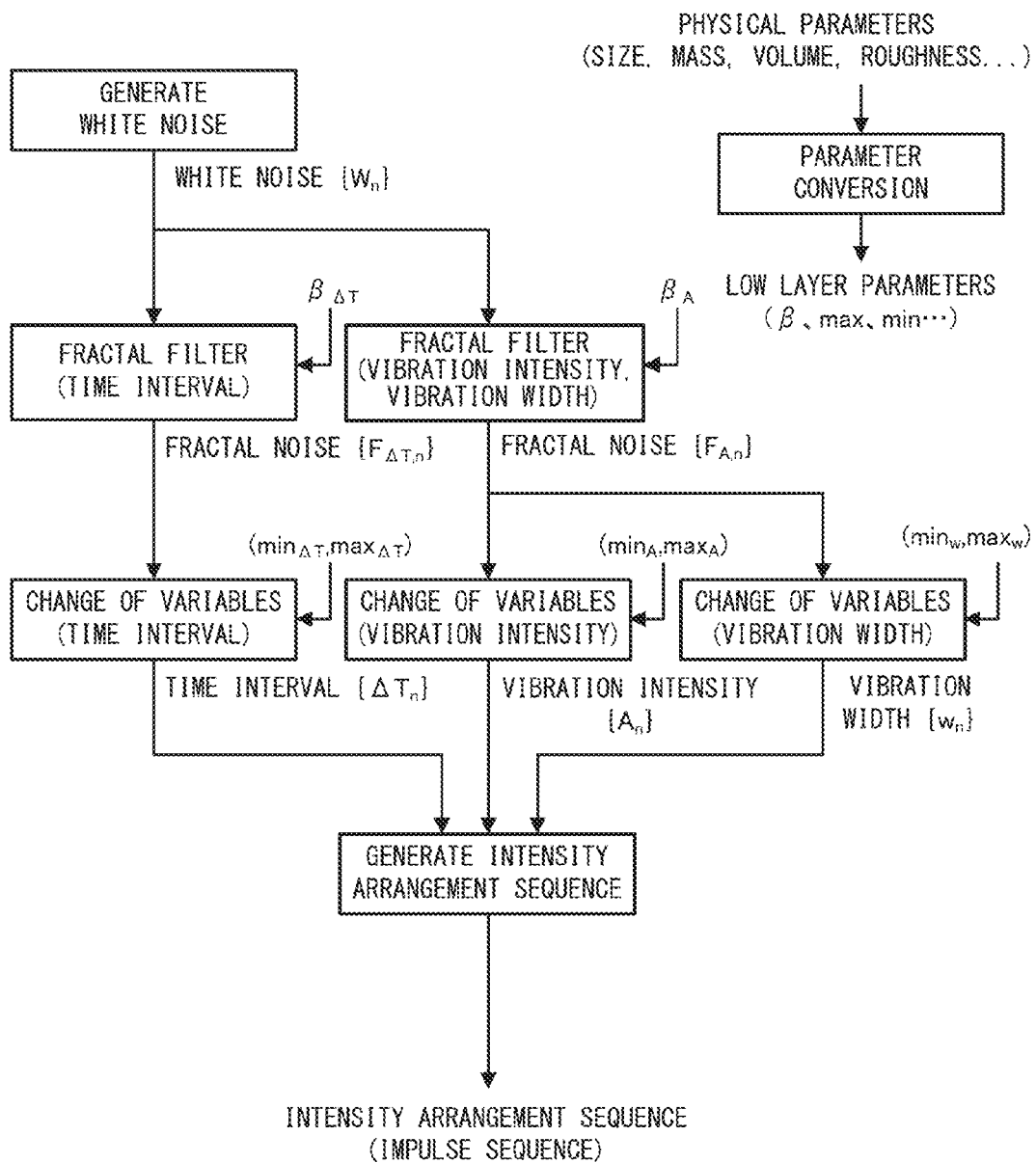
FIG. 7 is a diagram showing a non-limiting example of a processing procedure for generating an intensity arrangement sequence (an impulse sequence)
Figure 8:
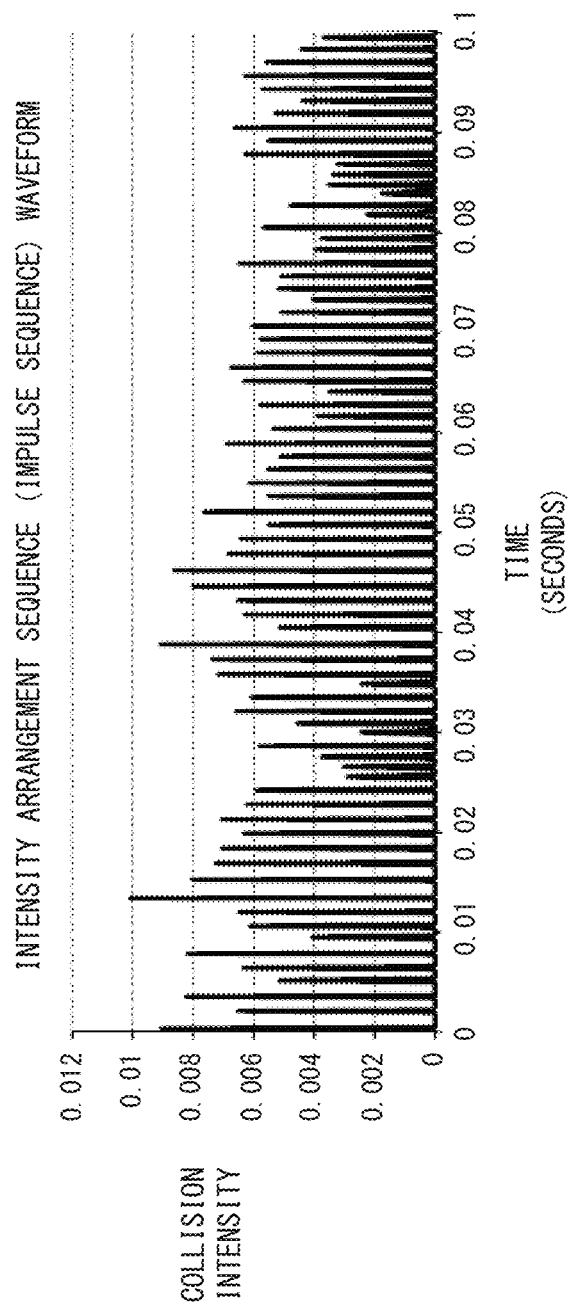
FIG. 8 is a diagram showing a non-limiting example of the intensity arrangement sequence generated by the processing procedure shown in FIG. 7.
Figure 10:
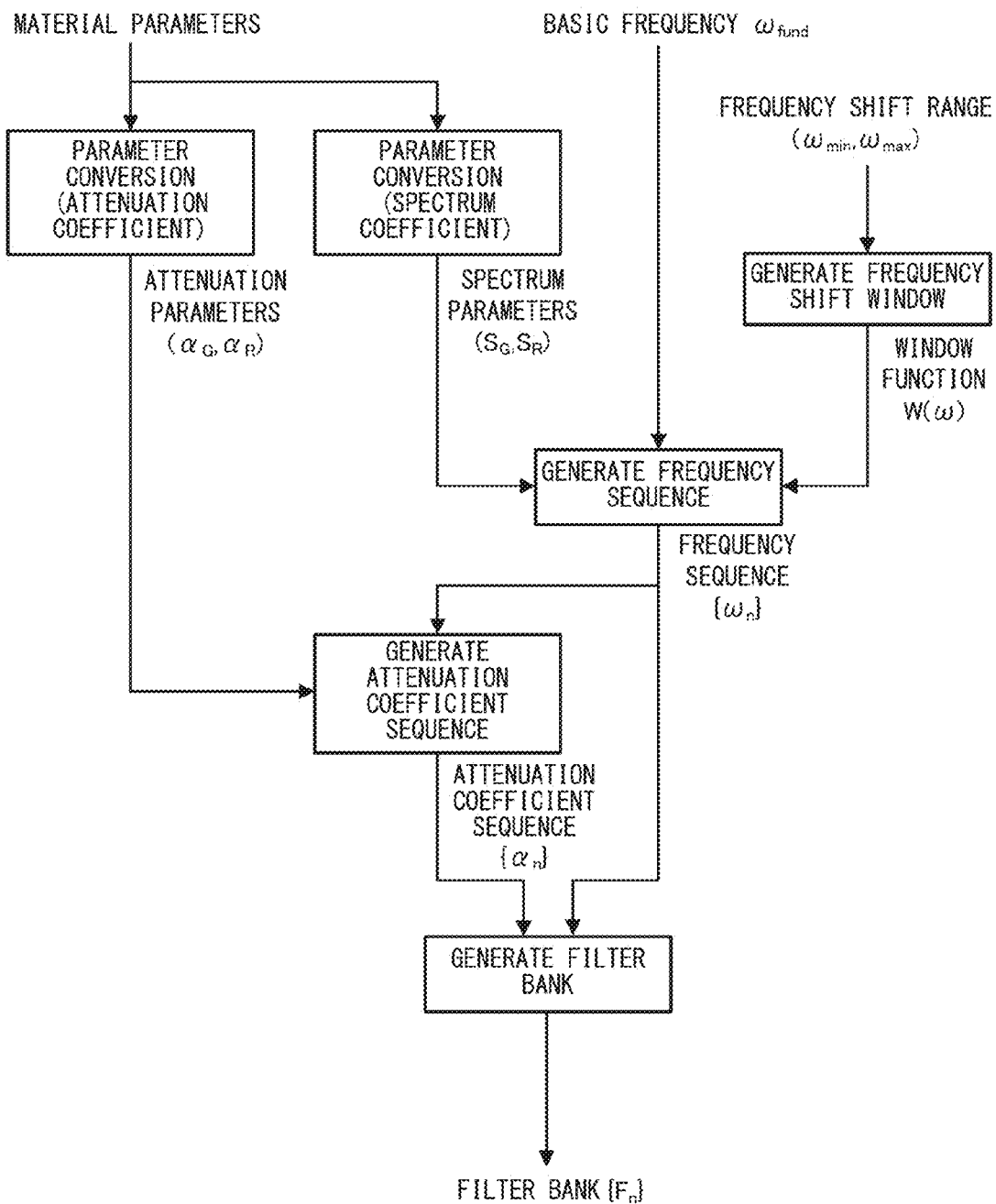
FIG. 10 is a diagram showing a non-limiting example of a processing procedure for setting a resonant filter.
Figures 11, 12:
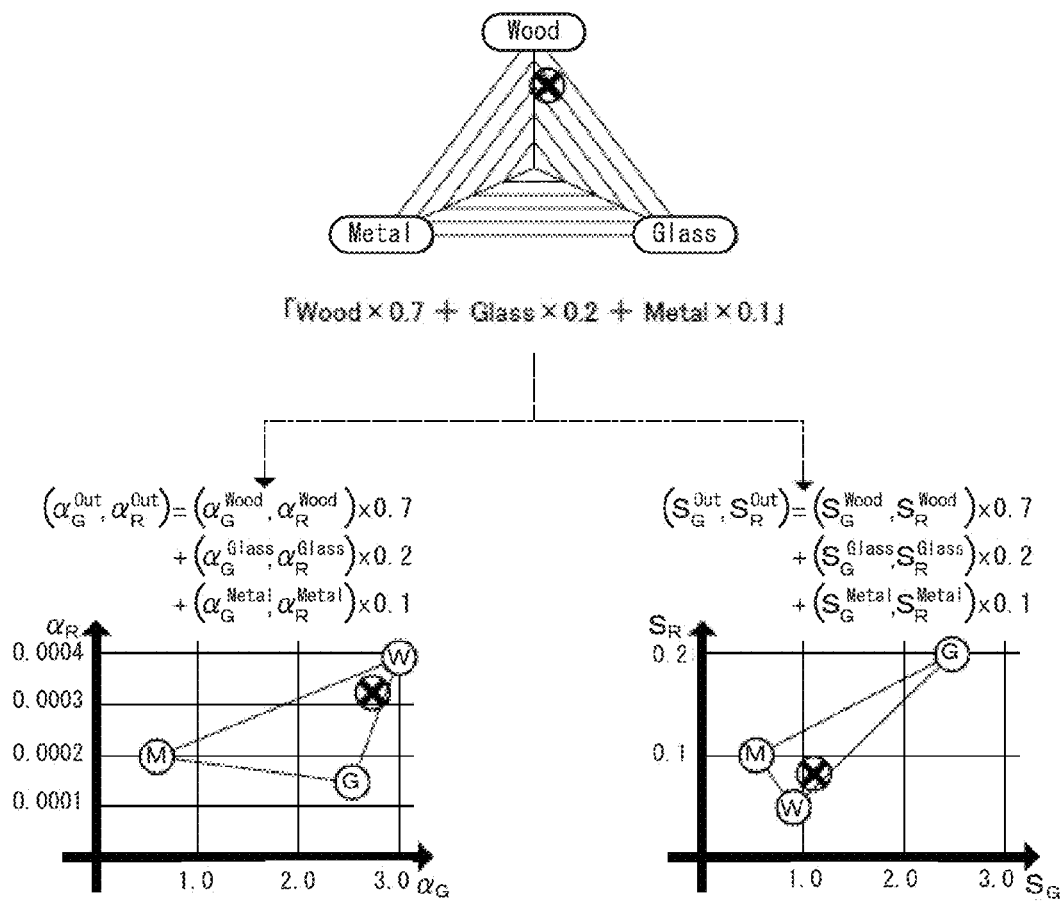
FIG. 11 is a diagram showing a non-limiting example of the process of calculating attenuation parameters and spectrum parameters from material parameters.
FIG. 12 is a diagram showing non-limiting examples of attenuation parameters and spectrum parameters calculated for each material.
Figure 13:
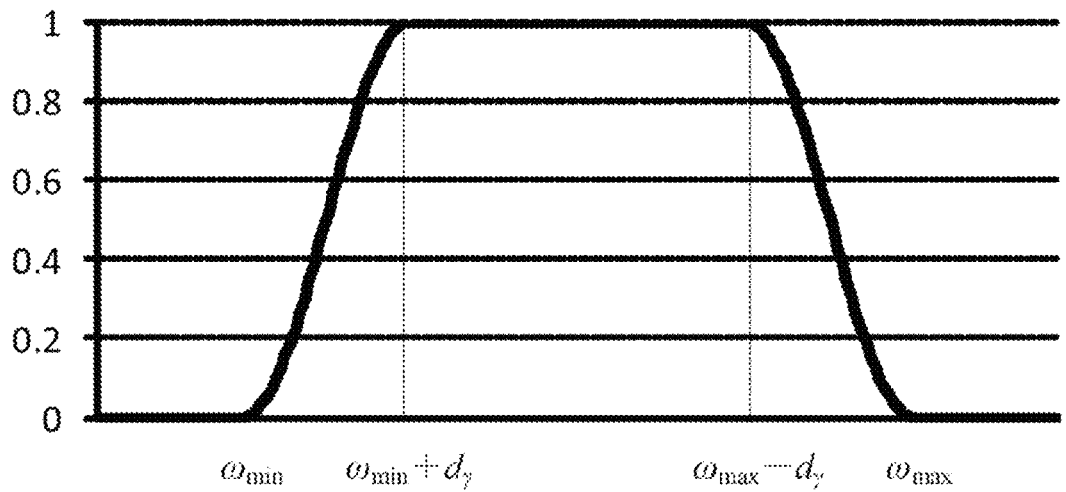
FIG. 13 is a diagram showing a non-limiting example of a window function for use in a resonant filter setting process.
Figure 14:
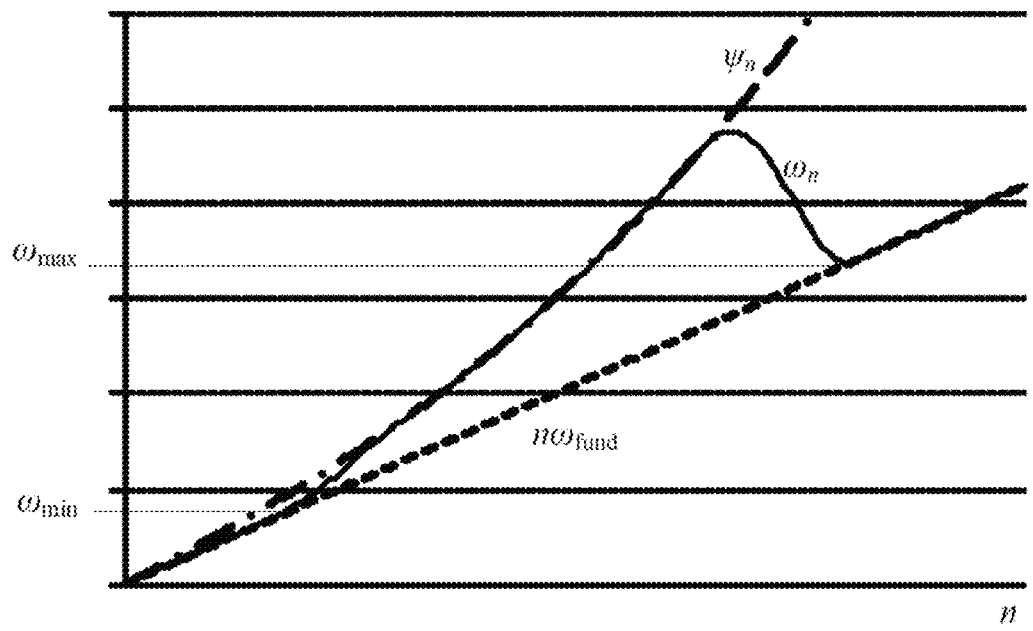
FIG. 14 is a diagram showing a non-limiting example of a change by a frequency sequence generation process.
Figure 15:
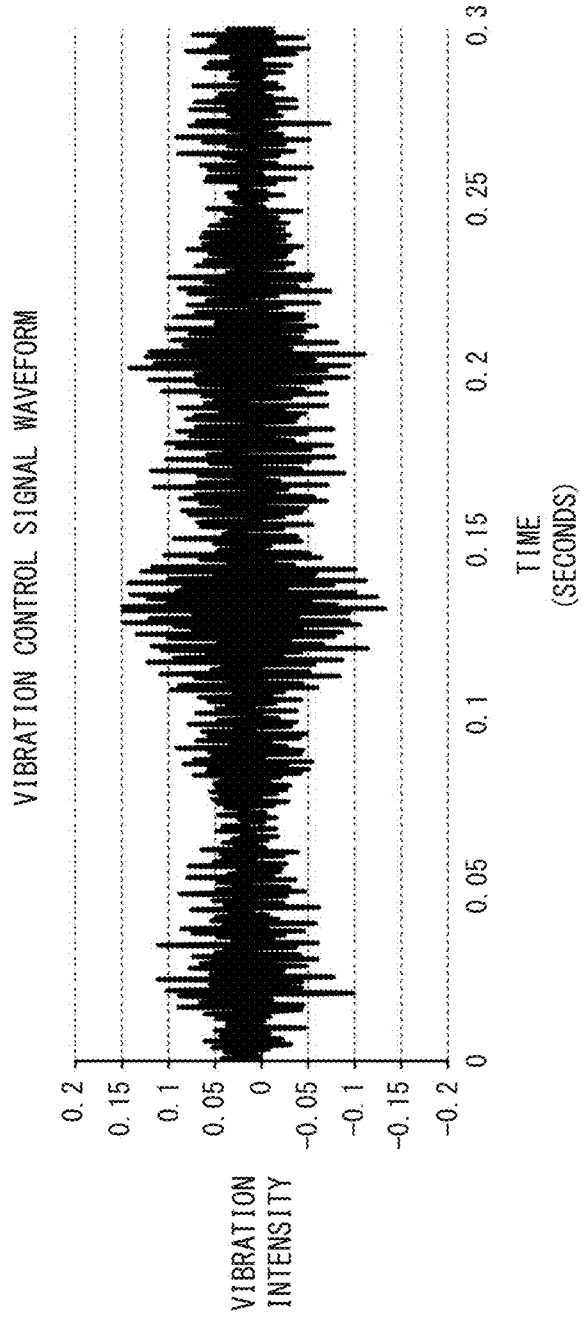
FIG. 15 is a diagram showing a non-limiting example of a vibration waveform (the waveform of a vibration control signal) generated using the resonant filter set by the resonant filter setting process shown in FIG. 10.
Figure 16:
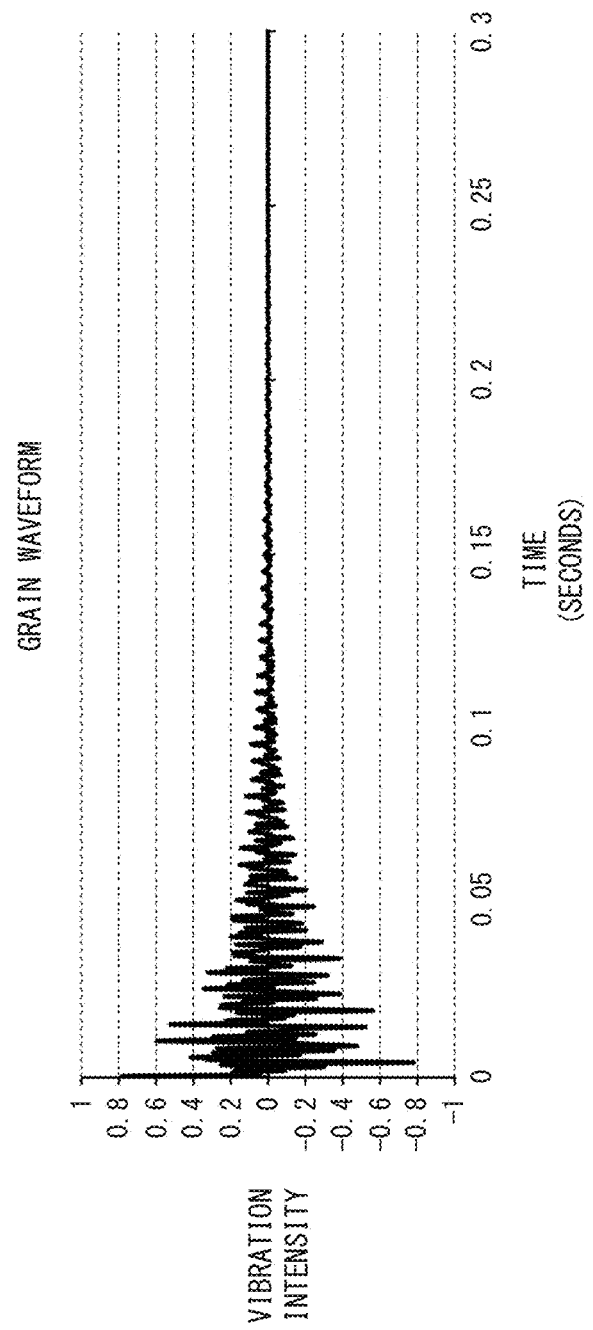
FIG. 16 is a diagram showing a non-limiting example of a grain waveform.

Next, with reference to FIGS. 7 to 16, a description is given of the details of a vibration signal generation process performed by the information processing apparatus 3. It should be noted that FIG. 7 is a diagram showing an example of a processing procedure for generating an intensity arrangement sequence (an impulse sequence). FIG. 8 is a diagram showing an example of the intensity arrangement sequence generated by the processing procedure shown in FIG. 7. FIG. 9 is a diagram illustrating examples of physical parameters for use in setting an intensity arrangement sequence and examples of the correlations between the physical parameters. FIG. 10 is a diagram showing an example of a processing procedure for setting a resonant filter. FIG. 11 is a diagram showing an example of the process of calculating attenuation parameters and spectrum parameters from material parameters. FIG. 12 is a diagram showing examples of attenuation parameters and spectrum parameters calculated for each material. FIG. 13 is a diagram showing an example of a window function for use in a resonant filter setting process. FIG. 14 is a diagram showing an example of a change by a frequency sequence generation process. FIG. 15 is a diagram showing an example of a vibration waveform (the waveform of a vibration control signal) generated using the resonant filter set by the resonant filter setting process shown in FIG. 10. FIG. 16 is a diagram showing an example of a grain waveform for use in the exemplary embodiment. It should be noted that the vibration signal generation process performed by the information processing apparatus 3 is performed by executing a vibration signal generation program described later. In this description, a description is given of the above vibration signal generation process in the second example.

Referring to FIG. 7, when an intensity arrangement sequence is generated, white noise is generated using a predetermined random number generation function. Here, the white noise is a random number sequence in which the intensities of all frequency components in a power spectrum as a result of Fourier transform are the same. As a first example, the white noise can be obtained using the output values of a function that generates random numbers in an interval [0,1) in accordance with uniform distribution, as they are. As a second example, the white noise can be obtained by performing a change of variables on each value of uniform random numbers such as multiplying the value by an inverse function of a cumulative distribution function, thereby generating a random number sequence according to an intended probability density. As a third example, the white noise can be obtained by summing up a plurality of uniform random numbers, thereby generating a random number sequence approximately according to normal distribution. For example, when an intensity arrangement sequence when an object rolls is generated, the white noise may be generated by summing up 12 random numbers generated in accordance with uniform distribution in an interval [0,1), then subtracting 6 from the summation result, and dividing the subtraction result by 3, thereby calculating a random number sequence approximately according to normal distribution.

Next, using white noise $\{W_n\}$ as input data, fractal noise $\{F_{\Delta T,n}\}$ for the time interval and fractal noise $\{F_{A,n}\}$ for the vibration intensity and the vibration width are generated. For example, a fractal filter process using white noise as input data is performed, thereby approximately generating fractal noise. Here, the fractal noise is a random number sequence in which the intensity of the component of a frequency f in a power spectrum is proportional to the exponent of f, and sets the randomness of the intensity arrangement sequence. As an example, a plurality of 1-zero and 1-pole IIR filters $F_k$ (k=1, 2, 3, . . . ) are connected in series, whereby it is possible to approximately achieve a fractal filter in which the intensity of the component of the frequency f is proportional to $1/f^\beta$.

The IIR filters $F_k$ can be determined by $$y(n)=x(n)-b_k x(n-1)+a_k y(n-1)$$

$$a_k=\exp(-2\pi c^{k-1}/L)$$

$$b_k=\exp(-2\pi c^{k-1+\beta/2}/L)$$

Here, x(n) means an nth output value. L is a positive constant representing a basic cycle. Generally, favorable approximation is achieved in a cycle less than or equal to L, and spectrum power is smaller than an ideal value in a cycle greater than L. Further, c is an approximation coefficient and is a constant greater than 1.0. The smaller the value of c, the higher the approximation accuracy. However, the number of filters N required to heighten the approximation accuracy also increases. Further, β is a spectrum parameter between 0.0 and 2.0 inclusive representing the slope of the power spectrum, and $\beta_{\Delta T}$ for the time interval and $\beta_A$ for the vibration intensity and the vibration width are calculated and updated as needed by a parameter conversion process described later.

The transfer function of the fractal filter in which N IIR filters Fk are connected in series is $$H(z) = \frac{\prod_{k=1}^{N}(1-e^{\beta/2}a_k z^{-1})}{\prod_{k=1}^{N}(1-a_k z^{-1})}$$

Here, N is the number of 1-zero and 1-pole IIR filters for use in approximation. The larger the number, the higher the approximation accuracy. However, the processing load also increases. When an intensity arrangement sequence when an object rolls is generated, as an example, settings may be made so that L=1024, c=8.0, and N=4. Further, in the process of generating fractal noise, a predetermined coefficient may be multiplied and output so that the output data falls within an appropriate range. As an example, when the intensity arrangement sequence is generated, the above coefficient may be set so that the output data approximately falls within an interval [−1,1].

Next, using the fractal noise $\{F_{\Delta T,n}\}$ for the time interval or the fractal noise $\{F_{A,n}\}$ for the vibration intensity and the vibration width as input data, a change of variables $\{\Delta T_n\}$ for the time interval, a change of variables $\{A_n\}$ for the vibration intensity, and a change of variables $\{w_n\}$ for the vibration width are performed to fall within a determined range [min,max]. As an example, the above change of variables is performed by simply performing linear conversion so that the interval [−1,1] is an interval [min,max]. As another example, a change of random variables is performed in accordance with probability distribution determined on the interval [min,max], thereby performing the above change of variables. Here, as the values of min and max, $\min_{\Delta T}$ and $\max_{\Delta T}$ for the time interval, $\min_A$ and $\max_A$ for the vibration intensity, and $\min_w$ and $\max_w$ for the vibration width are calculated and updated as needed by a parameter conversion process described later. Then, if min=max=C (constant), the output value is always C. Further, if min>max, a change of variables is performed by internally switching the values of min and max. Then, if the calculation result is outside the range [min,max], a clamp process is performed, thereby performing the change-of-variables process.

Next, using a time interval $\Delta T_n$ obtained by the change of variables, a vibration intensity $A_n$ obtained by the change of variables, and a vibration width $w_n$ obtained by the change of variables as input data, waveform data of the intensity arrangement sequence (the impulse sequence) is sequentially generated. Here, the time interval $\Delta T_n$ represents the time interval between an nth mountain-shaped waveform and an (n+1)th mountain-shaped waveform. The vibration intensity $A_n$ represents the height of the nth mountain-shaped waveform in the intensity arrangement sequence. The vibration width $w_n$ represents the width of the nth mountain-shaped waveform in the intensity arrangement sequence. However, if $w_n=0$, the width of a mountain-shaped waveform is regarded as corresponding to a single sample.

As a method for generating a mountain-shaped waveform in the intensity arrangement sequence, some techniques can be used. As an example, a generation formula for generating a mountain-shaped waveform having a height A and a width w when a time t=0 is: in the case of a mountain-shaped waveform based on a cosine wave $$f(t) = \begin{cases} A(1-|2t/w|)^\xi, & t \in [-w/2, w/2] \\ 0, & \text{otherwise} \end{cases}$$

in the case of a mountain-shaped waveform based on a triangular wave $$f(t) = \begin{cases} A((\cos(2\pi t/w)+1)/2)^\xi, & t \in [-w/2, w/2] \\ 0, & \text{otherwise} \end{cases}$$

Here, $\xi$ is a nonnegative parameter representing the sharpness of the mountain-shaped waveform. If $\xi$ is brought close to 0, the mountain-shaped waveform has a shape close to a rectangular wave. If the value of is increased, the waveform near a local maximum value of the mountain-shaped waveform has a sharp shape. However, the value may be fixed to $\xi=1$. FIG. 8 is an example of waveform data of the intensity arrangement sequence (the impulse sequence) generated based on such a generation formula.

Here, the above parameter conversion process is described. In the parameter conversion process in the vibration signal generation process, physical parameters corresponding to a physical phenomenon in the virtual space generated in accordance with the execution of the predetermined application are acquired, and parameters for a low layer for use in the above processes are calculated based on the acquired physical parameters. For example, in the parameter conversion process, the correlations between the physical parameters and the parameters for a low layer obtained from a physical simulation performed in advance may be used. As an example, in the rolling phenomenon of a sphere, linear regression analysis is performed on a physical simulation performed in advance, thereby obtaining the correlations as shown in FIG. 9. Internal calculation is made based on these correlations, thereby calculating parameters for a low layer.

Next, with reference to FIG. 10, a resonant filter setting process in the vibration signal generation process is described. First, in the resonant filter setting process, a parameter conversion process for acquiring material parameters corresponding to materials in the virtual space generated in accordance with the execution of the predetermined application, and outputting a pair of attenuation parameters ($\alpha_G, \alpha_R$) or a pair of spectrum parameters ($S_G, S_R$) as a combination corresponding to the material parameters is performed. For example, preset materials include three types such as wood, glass, and metal, material parameters as input values in the parameter conversion process are represented by the ratio of combination of these materials such as "wood×0.7+glass×0.2+metal×0.1".

As shown in FIG. 11, in the parameter conversion process, in a two-dimensional space having a global parameter ($\alpha_G$ or $S_G$) and relative parameters ($\alpha_R, S_R$) as its axes, the coordinates of points corresponding to the preset materials are summed up in a specified ratio, thereby calculating output values. It should be noted that the values of the pair of attenuation parameters ($\alpha_G, \alpha_R$) and the pair of spectrum parameters ($S_G, S_R$) for each material may be set by analyzing recorded vibration and sound. For example, as shown in FIG. 12, it is possible to set the values of the pair of attenuation parameters ($\alpha_G, \alpha_R$) and the pair of spectrum parameters ($S_G, S_R$) for each of the three types of materials, namely wood, glass, and metal.

Next, a frequency shift window generation process for, using a frequency shift range ($\omega_{min}, \omega max$) as input data, generating a window function $W(\omega)$ that takes a nonnegative value in this interval is performed. The window function $W(\omega)$ is used to generate a frequency in a frequency sequence generation process described later. The window function $W(\omega)$ is used, thereby applying the frequency sequence generation process only in the range of the interval ($\omega_{min}, \omega_{max}$).

For example, the window function $W(\omega)$ is a function satisfying $$W(\omega) = \begin{cases} \text{MONOTONIC INCREASE FROM 0 TO 1,} & \omega \in [\omega_{min}, \omega_{min}+d_\gamma] \\ 1(\text{FIXED VALUE}), & \omega \in [\omega_{min}+d_\gamma, \omega_{max}-d_\gamma] \\ \text{MONOTONIC DECREASE FROM 1 TO 0,} & \omega \in [\omega_{max}-d_\gamma, \omega_{max}] \\ 0(\text{FIXED VALUE}), & \text{otherwise} \end{cases}$$

Here, $d_\gamma$ is $$d_\gamma = \frac{(\omega_{max}-\omega_{min})(1-\gamma)}{2}, \gamma \in [0,1]$$

and represents a transition width when the value of the window function transitions from 0 to 1. Then, if $\gamma=0$, $d_\gamma=(\omega_{max}-\omega_{min})/2$, and the value of $W(\omega)$ gradually transitions. Further, if $\gamma=1$, $d_\gamma=0$, and $W(\omega)$ is a rectangular window. As an example, if a cosine function is used for the transition from 0 to 1, it is possible to use a window function (see FIG. 13) defined by $$W(\omega) = \begin{cases} (1-\cos((\omega-\omega_{min})\pi/d_\gamma))/2, & \omega \in [\omega_{min}, \omega_{min}+d_\gamma] \\ 1, & \omega \in [\omega_{min}+d_\gamma, \omega_{max}-d_\gamma] \\ (1-\cos((\omega_{max}-\omega)\pi/d_\gamma))/2, & \omega \in [\omega_{max}-d_\gamma, \omega_{max}] \\ 0, & \text{otherwise} \end{cases}$$

Here, if $\gamma=0$, $W(\omega)$ coincides with the Hann window. It should be noted that when a resonant filter for the rolling of an object is set, the value may be fixed to $\gamma=0.9$. Further, the same value as a basic frequency $\omega_{fund}$ may be used as $\omega_{min}$, and the Nyquist frequency may be used as $\omega_{max}$.

Next, a frequency sequence generation process for generating a frequency sequence $\{\omega_n\}$ using the values of the pair of spectrum parameters ($S_G, S_R$) and the basic frequency $\omega_{fund}$ as input data is performed. In the generation of a frequency sequence, the window function $W(\omega)$ generated in the above frequency shift window generation process is used. For example, an nth frequency $\omega_n$ is calculated using $$\psi_n = n\omega_{fund} S_G \sqrt{1+S_R n^2}$$

$$r_n = W(n\omega_{fund})$$

$$\omega_n = r_n \psi_n + (1-r_n)n\omega_{fund}$$

Here, the pair of spectrum parameters ($S_G, S_R$) is related to the degree of shifting from $n\omega_{fund}$, which is an integral multiple of the basic frequency $\omega_{fund}$, thereby generating $\psi$n. For example, if $(S_G, S_R)=(1,0)$, $\psi_n = n\omega_{fund}$. Particularly, the global parameter $S_G$ is related to the degree of shifting from a frequency obtained by calculating an integral multiple of the entirety of the frequency sequence $\{\psi_n\}$, thereby generating $\psi$n. On the other hand, the relative parameter $S_R$ is related to the degree of increasing the shift from the integral multiple frequency as the frequency increases. Further, $r_n$ is the output value of the window function and represents the internal division ratio between the shifted frequency $\psi_n$ and the integral multiple frequency $n\omega_{fund}$. Then, $r_n$ is 0 outside the interval $(\omega_{min}, \omega_{max})$, and therefore, the frequency sequence generation process is performed only within the interval. Changes in $n\omega_{fund}$, $\omega_n$, and $\psi_n$ according to an increase in n are as shown in FIG. 14.

In the above frequency sequence generation process, it is possible to infinitely generate a frequency sequence. In the exemplary embodiment, however, when the frequency band that a human being can recognize is exceeded, the generation of $\omega_n$ ends. If a frequency sequence is used for a vibration signal (i.e., a signal for presenting tactile sensation), the frequency sequence $\{\omega_n\}$ may be generated only in the range of $\omega_n < 1000$ Hz.

Next, an attenuation coefficient sequence generation process for, using the pair of attenuation parameters $(\alpha_G, \alpha_R)$ and the frequency sequence $\{\omega_n\}$ as input data, generating an attenuation coefficient sequence $\{\alpha_n\}$ corresponding to each frequency is performed. For example, an nth attenuation coefficient $\alpha_n$ is calculated using $$\alpha_n = \exp(\alpha_G + \alpha_R \omega_n)$$

The attenuation coefficient $\alpha_n$ is such that the greater the value, the more rapidly the component of the frequency $\omega_n$ attenuates. Then, as is clear from the calculation formula for $\alpha_n$, if the same attenuation parameters are used, generally, a high frequency attenuates more rapidly. Further, the global parameter $\alpha_G$ is related to the attenuation coefficients of all frequencies. The greater the value, the more rapidly the attenuation coefficient attenuates. On the other hand, the relative parameter $\alpha_R$ is related to the degree of increasing the attenuation coefficient as the frequency increases. The greater the value, the greater the degree of increase in the attenuation coefficient at a high frequency.

Next, a filter bank generation process for, using a pair of the frequency and the attenuation coefficient $(\alpha_n, \omega_n)$ as input data, sequentially generating a digital filter $F_n$ having an impulse response corresponding to the pair is performed. For example, the digital filter $F_n$ is achieved as a biquad filter defined using $$y(k) = r_n \sin(\theta_n) x(k-2) + 2r_n \cos(\theta_n) y(k-1) - r_n^2 y(k-2)$$

$$\theta_n = 2\pi \omega_n / f_s$$

$$r_n = 1 - \alpha_n / f_s$$

Here, x(k) represents a kth input value. Further, y(k) represents a kth output value. Then, $f_s$ represents the sampling rate of a digital waveform. Further, if impulse data having a width of 1 and a height of 1 is input to the digital filter Fn, a digital waveform approximating a damped sine wave represented by $$f(t) = \exp(-\alpha_n t) \sin(2\pi \omega_n t)$$

is output. Then, a resonant filter (a material filter) for achieving the vibration of a specified material is set by forming a synthesis filter in which all digital filters F1, F2, F3, . . . are connected in series. FIG. 15 is a diagram showing an example of a vibration waveform (the waveform of a vibration control signal) obtained by passing waveform data indicating an intensity arrangement sequence (an impulse sequence) generated by an intensity arrangement sequence generation process generated based on such a generation formula described above, through the resonant filter set by the above resonant filter setting process. Further, FIG. 16 is a diagram showing an example of a grain waveform corresponding to a specified material and obtained by inputting impulse data having a width of 1 and a height of 1 to the resonant filter set by the above resonant filter setting process.

It should be noted that in the above descriptions of the intensity arrangement sequence generation process and the resonant filter setting process, an example is used where the above vibration signal generation process in the second example is performed. Alternatively, the intensity arrangement sequence generation process may be achieved by a similar process also in the above vibration signal generation process in the first example. In this case, a grain generated by recording a vibration in the real world and a sound in the real world, or a grain obtained by inputting impulse data having a width of 1 and a height of 1 to a resonant filter set by the above resonant filter setting process is arranged and convolved based on an intensity arrangement sequence (an impulse sequence) generated by the intensity arrangement sequence generation process, whereby it is possible to generate in real time a vibration waveform corresponding to the execution of the predetermined application.

Figure 17:
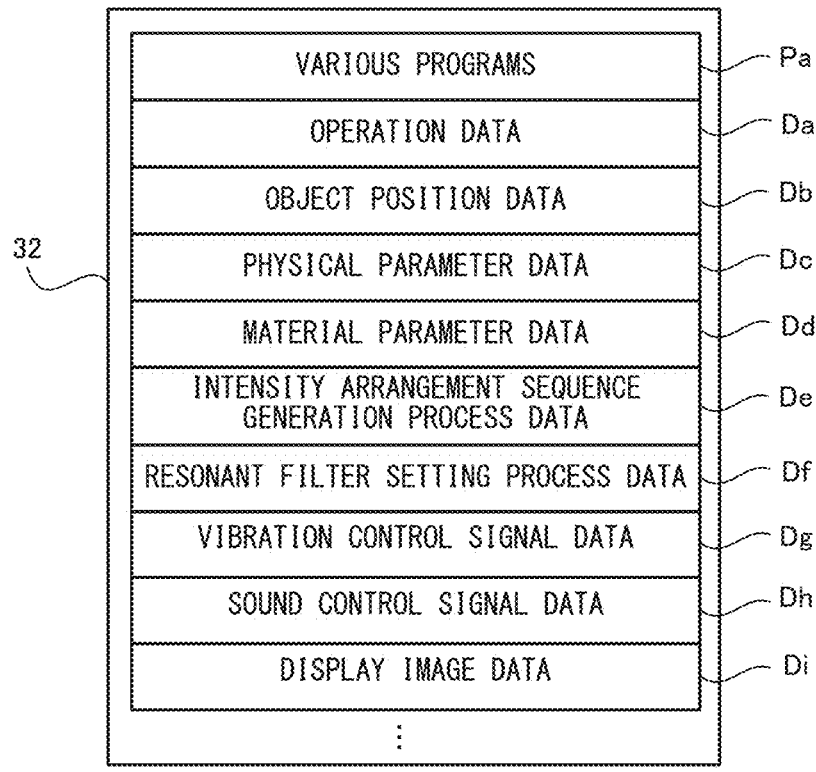
FIG. 17 is a diagram showing non-limiting examples of main data and programs stored in a storage section 32 of the information processing apparatus 3.

Next, with reference to FIG. 17, main data used in game processing, which is an example of information processing, is described. FIG. 17 is a diagram showing examples of main data and programs stored in the storage section 32 of the information processing apparatus 3 when the game processing is performed. It should be noted that the following description of the game processing uses the exemplary game where the virtual object OBJ moves on the board surface in the virtual space (see FIG. 4).

As shown in FIG. 17, the following are stored in the data storage area of the storage section 32: operation data Da; object position data Db; physical parameter data Dc; material parameter data Dd; intensity arrangement sequence generation process data De; resonant filter setting process data Df; vibration control signal data Dg; sound control signal data Dh; display image data Di; and the like. It should be noted that the storage section 32 may store, as well as the data shown in FIG. 17, data and the like necessary for the processing, such as data used in an application to be executed. Further, in the program storage area of the storage section 32, various programs Pa included in a game program are stored. For example, the various programs Pa include a game program for performing the game processing in the information processing apparatus 3 to display an image on the display section 35, a vibration signal generation program for generating a vibration control signal to impart a vibration to the information processing apparatus 3, a sound generation program for generating a sound control signal to output a sound from the information processing apparatus 3, and the like.

The operation data Da is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data Da may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Db is data representing the position of the virtual object OBJ moving in the virtual space (see FIG. 4).

The physical parameter data Dc is data representing physical parameters indicating the physical phenomena of the virtual object OBJ and the board surface obtained in accordance with the fact that the game processing is performed. For example, the physical parameters are parameters indicating the mass of the virtual object OBJ, the speed of the virtual object OBJ, the size of the virtual object OBJ, the particle densities of the virtual object OBJ and the board surface on which the virtual object OBJ moves, the unevenness size of the surface of the board surface, the unevenness fractal nature of the surface of the board surface, and the like.

The material parameter data Dd is data representing material parameters indicating the materials of the virtual object OBJ and the board surface obtained in accordance with the fact that the game processing is performed. For example, the material parameters are parameters indicating the material of the virtual object OBJ, the material of the part of the board surface with which the virtual object OBJ is in contact.

The intensity arrangement sequence generation process data De is data representing various parameters calculated in the intensity arrangement sequence generation process and an intensity arrangement sequence generated in the intensity arrangement sequence generation process.

The resonant filter setting process data Df is data representing various parameters calculated in the resonant filter setting process and a resonant filter set in the resonant filter setting process.

The vibration control signal data Dg is data representing a vibration control signal generated in the intensity arrangement sequence generation process and the resonant filter setting process, and is data representing a vibration control signal (the vibration control signal CS; see FIG. 3) to be output from the control section 31 to the vibration generation section 37.

The sound control signal data Df is data representing a sound control signal to be output from the control section 31 to the sound output section 36.

The display image data Dk is data for generating an image of each virtual object such as the virtual object OBJ, a background image, and the like and displaying the generated images on the display section 35.

Figure 18:
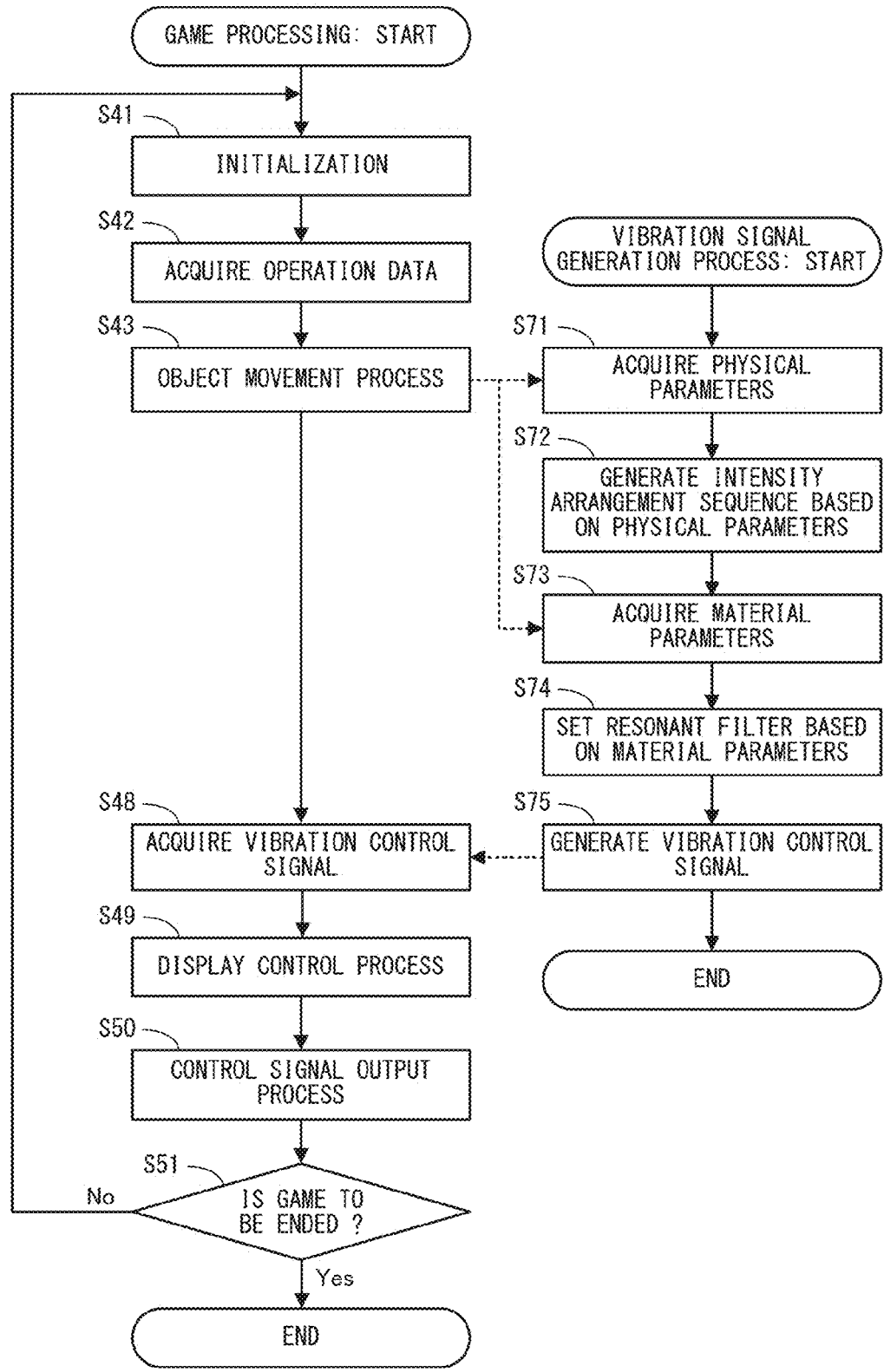
FIG. 18 is a flow chart showing a non-limiting example of game processing performed by the information processing apparatus 3.

Next, with reference to FIG. 18, a detailed description is given of the game processing, which is an example of the information processing performed by the information processing apparatus 3. It should be noted that FIG. 18 is a flow chart showing an example of the game processing performed by the information processing apparatus 3. Here, in the flow chart shown in FIG. 18, a description is given mainly of, in the processing performed by the information processing apparatus 3, the process of causing the virtual object OBJ to move in the virtual world by executing the game program and the vibration signal generation program, and then outputting a vibration corresponding to the movement. The detailed descriptions of other processes not directly related to these processes are omitted. Further, in the flow chart shown in FIG. 18, an example is used where a vibration control signal is generated using the above vibration signal generation process in the second example. Further, in FIG. 18, all of the steps performed by the control section 31 are abbreviated as "S".

The CPU of the control section 31 initializes a memory and the like of the storage section 32 and loads the game program from the program storage section 33 into the memory. Then, the CPU starts the execution of the game program. Further, the CPU of the control section 31 also loads the vibration signal generation program from the program storage section 33 into the memory. Then, the CPU also starts the execution of the vibration signal generation program in parallel with the execution of the game program. The flow chart shown in FIG. 18 is a flow chart showing the processing performed after the above processes are completed. Typically, the processes of steps 41 to 51 are performed by executing the game program, and the processes of steps 71 to 75 are performed by executing the vibration signal generation program.

It should be noted that the processes of all of the steps in the flow chart shown in FIG. 18 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 18, the control section 31 performs initialization when the game program is executed (step 41), and proceeds to the next step. For example, the control section 31 constructs a virtual space to be displayed on the display section 35 and initializes parameters. As an example, the control section 31 places the virtual object OBJ at an initial position on the board surface in the virtual space and sets the object position data Db. Further, the control section 31 sets the display range to be displayed on the display screen of the display section 35 for the virtual space.

Next, the control section 31 acquires operation data from the input section 34 and updates the operation data Da (step 42), and the processing proceeds to the next step.

Next, the control section 31 performs the process of causing the virtual object OBJ to move along the board surface in the virtual space (step 43), and the processing proceeds to the next step. For example, the control section 31 causes the virtual object OBJ to move so as to roll on the board surface along a movement path determined in advance in the virtual space and at a moving speed determined in advance, and updates the object position data Db using the position after the movement. As another example, to cause the virtual object OBJ to move in accordance with an operation on the input section 34 (including the operation of moving or tilting the main body of the information processing apparatus 3), the control section 31 causes the virtual object OBJ to move in the virtual space in accordance with the operation data acquired in the above step 42, and updates the object position data Db using the position after the movement.

Meanwhile, the vibration signal generation program is executed in parallel, and physical parameters indicating the physical phenomena of the virtual object OBJ based on the object position data Db updated in accordance with the process of step 43 and the board surface, material parameters indicating the material of the virtual object OBJ and the material of the board surface with which the virtual object OBJ is in contact based on the object position data Db, and the like are received. Then, the vibration signal generation program is executed, thereby generating a vibration control signal based on these parameters. It should be noted that the vibration signal generation process performed by executing the vibration signal generation program is performed in parallel with the processes of steps 71 to 75 described later. These processes will be described later.

After the process of step 43, the control section 31 acquires the vibration control signal generated by executing the vibration signal generation program in parallel (step 48), and the processing proceeds to the next step. For example, the control section 31 acquires the generated vibration control signal and updates the vibration control signal data Dg.

Next, the control section 31 performs a display control process (step 49), and the processing proceeds to the next step. For example, based on an image generation program and the object position data Db, the control section 31 performs the process of generating an image of the virtual space in which the virtual object OBJ is placed, and displaying on the display section 35 the image of the virtual space in the set display range.

Next, the control section 31 performs a control signal output process (step 50), and the processing proceeds to the next step. For example, the control section 31 outputs to the vibration generation section 37 the vibration control signal CS indicated by the vibration control signal data Dg. Consequently, the vibration generation section 37 generates a vibration corresponding to the vibration control signal CS from the actuator 373. Further, the control section 31 outputs to the sound output section 36 the sound control signal indicated by the sound control signal data Dh. Consequently, the sound output section 36 outputs a sound corresponding to the sound control signal from the loudspeaker.

Based on the sound generation program and the type of the virtual object OBJ placed in the virtual world, the control section 31 sets the type of a sound (a sound source) when the virtual object OBJ moves. Then, the control section 31 generates a sound control signal using data representing the type of the sound and updates the sound control signal data Dh. It should be noted that a sound control signal may be generated using the same intensity arrangement sequence generated in the above step 72. In this case, a sound material (a sound grain) recorded in advance in the real world may be arranged and convolved based on the intensity arrangement sequence, thereby generating a sound waveform. Alternatively, data representing the intensity arrangement sequence may be passed through a sound resonant filter that is the same as or different from the resonant filter set in the above step 74, thereby generating a sound waveform. It should be noted that if a sound waveform is generated using a sound resonant filter different from the resonant filter set in the above step 74, at least one of the biquad filters included in the resonant filter may be formed of the same biquad filter. For example, the sound resonant filter may be formed by adding at least one biquad filter corresponding to a high-frequency band to the vibration resonant filter set in the above step 47.

Next, the control section 31 determines whether or not the game processing is to be ended (step 51). Examples of conditions for ending the game processing include: the satisfaction of the condition under which the game processing is ended; and the fact that the user performs the operation of ending the game processing. If the game processing is not to be ended, the control section 31 returns to the above step 42 and repeats the process thereof. If the game processing is to be ended, the control section 31 ends the processing indicated by the flow chart.

On the other hand, the control section 31 executes the vibration signal generation program in parallel, thereby acquiring physical parameters generated in accordance with the execution of the game program (step 71), and the processing proceeds to the next step. For example, the control section 31 extracts physical parameters indicating the physical phenomena of the virtual object OBJ placed in the object position data Db updated in the above step 43 and the board surface (e.g., parameters indicating the movement method (moving while rolling, moving while being rubbed against the other, or the like), the moving speed, the mass, the size, and the particle density of the virtual object OBJ, the unevenness size, the unevenness fractal nature, the particle density of the board surface with which the virtual object OBJ is in contact, and the like), and updates the physical parameter data Dc using the physical parameters.

Next, the control section 31 performs an intensity arrangement sequence generation process using the physical parameters acquired in the above step 71 (step 72), and the processing proceeds to the next step. For example, the control section 31 updates the intensity arrangement sequence generation process data De using data representing an intensity arrangement sequence generated by an intensity arrangement sequence generation process. It should be noted that the intensity arrangement sequence generation process performed in the above step 72 is similar to the intensity arrangement sequence generation process described with reference to FIGS. 7 to 9 and therefore is not described in detail here.

Next, the control section 31 acquires material parameters generated in accordance with the execution of the game program (step 73), and the processing proceeds to the next step. For example, the control section 31 extracts material parameters indicating the material of the virtual object OBJ placed in the object position data Db updated in the above step 43 and the material of the board surface with which the virtual object OBJ is in contact, and updates the material parameter data Dd using the material parameters.

Next, the control section 31 performs a resonant filter setting process using the material parameters acquired in the above step 46 (step 74), and the processing proceeds to the next step. For example, the control section 31 updates the resonant filter setting process data Df using data representing a resonant filter generated in a resonant filter setting process. It should be noted that the resonant filter setting process performed in the above step 74 is similar to the resonant filter setting process described with reference to FIGS. 10 to 16 and therefore is not described in detail here.

Next, the control section 31 performs a vibration control signal generation process (step 75), and the processing of the flow chart ends. It should be noted that in the vibration control signal generation process performed in the above step 75, a vibration control signal (the vibration control signal CS to be output to the vibration generation section 37; see FIG. 3) is generated using a digital waveform output by passing the data representing the intensity arrangement sequence generated in the above step 72, through the resonant filter set in the above step 74. This makes it possible to generate in real time a vibration control signal corresponding to the execution of the game application and impart a vibration corresponding to the vibration control signal to the main body of the information processing apparatus 3.

As described above, in the processing according to the above exemplary embodiment, it is possible to generate in real time a vibration control signal corresponding to the execution of an information processing application (e.g., a game application) and impart a vibration corresponding to the vibration control signal to the main body of the information processing apparatus 3. Further, it is possible to generate in real time not only a simple vibration waveform prepared in advance but also a complex vibration waveform by changing an intensity arrangement sequence. Thus, it is possible to impart to the user a vibration of which the feel is unlikely to be monotonous and which is rich in variety. Further, even if the information processing application to be executed is different, but if physical parameters and material parameters acquired in accordance with the execution of the application are the same, this can result in imparting the same vibration to the user. Thus, the processing according to the above exemplary embodiment is useful as a vibration waveform generation technique that can be commonly used for a plurality of applications.

It should be noted that in the above exemplary embodiment, in the resonant filter setting process, when the number of biquad filters included in the resonant filter is determined, the number of biquad filters is limited by ending the generation of the frequency sequence $\{\omega_n\}$ when the frequency band (e.g., 1000 Hz) that a human being can recognize is exceeded. Alternatively, the number of biquad filters may be limited by another method. For example, the number itself of the frequency sequence $\{\omega_n\}$ to be generated may be limited to a predetermined number (for example, four), thereby limiting the number of biquad filters included in the resonant filter to the predetermined number. Yet alternatively, a plurality of limitations including a limitation based on a frequency band, a limitation based on a set number, and the like may be set, and if at least one of the limitations is satisfied, the generation of the frequency sequence $\{\omega_n\}$ may be ended.

In addition, in the above exemplary embodiment, to impart randomness to a vibration to be generated, an intensity arrangement sequence is generated using fractal noise in the intensity arrangement sequence generation process. Alternatively, randomness may be ensured by another technique. For example, the randomness of an intensity arrangement sequence may be ensured using not only fractal noise but also another type of noise (e.g., white noise or red noise as it is). Yet alternatively, the randomness of an intensity arrangement sequence may be ensured using another random number generation method, without using various types of noise.

In addition, in the above exemplary embodiment, in accordance with parameters corresponding to physical phenomena and materials in the virtual space generated in accordance with the execution of the predetermined application, an intensity arrangement sequence is changed in real time, thereby generating a vibration control signal in real time. Alternatively, a grain for use in the vibration signal generation process in the first example may also be generated in real time in accordance with at least one of the above parameters. In this case, a grain for generating a vibration may be generated in real time, or a grain for generating a sound may be generated in real time. As an example, the grain may be set in real time by setting the above resonant filter in real time based on at least one of the above parameters, and inputting impulse data having a width of 1 and a height of 1. As another example, the grain may be set in real time using a predetermined algorithm based on the material feel of an image for which a vibration is generated (e.g., wood grain, unevenness on a microscopic level, or the like), the density and the hardness set for the image, or the like.

In addition, in the above exemplary embodiment, an example is used where a single actuator 373 is provided in the information processing apparatus 3. Alternatively, a plurality of actuators for imparting vibrations to the user may be provided. As an example, a pair of actuators may be provided on the left and right of the information processing apparatus 3. In this case, the control section 31 may use a generated vibration control signal as it is to drive the left and right actuators, or may use a vibration control signal in which intensity distribution for driving the left and right actuators is adjusted, to drive the left and right actuators.

In addition, in the above exemplary embodiment, based on parameters regarding a virtual object per se (physical parameters and material parameters), an intensity arrangement sequence (an impulse sequence) and a grain are changed or generated. Alternatively, parameters for changing or generating an intensity arrangement sequence (an impulse sequence) and a grain may be not only parameters regarding a virtual object per se but also parameters corresponding to the environment (the temperature, the humidity, the weather, or the like) around the virtual object in the virtual world and the operation of the user (the strength of the operation, the direction of the operation, the presence or absence of the operation, the type of the operation, or the like). As described above, in the exemplary embodiment, based on various parameters acquired from a predetermined application, a vibration waveform for generating a vibration to be imparted to the user can be generated in real time.

In addition, if an information processing system is used in which a controller held and operated by the user and a display apparatus are separate from each other, an actuator for imparting a vibration to the user may be provided in the controller. In this case, a control section for performing the vibration control signal generation process and an actuator can be provided in different apparatuses. However, a signal capable of controlling the driving of the actuator (e.g., the vibration control signal CS, the analog vibration signal AS, or the driving signal DS) is output to the controller in which the actuator is provided, whereby it is possible to achieve a similar exemplary embodiment. Further, even in an information processing system that does not include a display screen or does not display an image on a display screen, an actuator is provided in an apparatus that comes into contact with the body of the user, whereby it is possible to impart the above vibration to the user. In this case, based on parameters acquired from an application for detecting the situation of the user themselves and the environment around the user, a game application that does not display an image, or the like, a vibration waveform for generating a vibration to be imparted to the user can be generated in real time.

In addition, the above descriptions are given using the example where the information processing apparatus 3 performs information processing (the vibration control signal generation process and the game processing). Alternatively, another apparatus may perform at least some of the processing steps in the information processing. For example, if the information processing apparatus 3 is further configured to communicate with another apparatus (e.g., another server, another game apparatus, or another mobile terminal), the other apparatus may cooperate to perform the processing steps of the information processing. As an example, another apparatus may perform at least one of the virtual world image generation process and the vibration control signal generation process, and the information processing apparatus 3 may acquire image data and control signals indicating the result of the process. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. It should be noted that the information processing system including at least one information processing apparatus can be an information processing system including a plurality of information processing apparatuses (a so-called system including a complex of a plurality of apparatuses), or can be an information processing system including a single information processing apparatus (a so-called system including a single apparatus including a plurality of units). Further, in the above exemplary embodiment, the processing indicated in the above flow chart is performed by the control section 31 of the information processing apparatus 3 executing a predetermined vibration signal generation program. Alternatively, a part or all of the information processing indicated in the flow chart may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the information processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above information processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a mobile apparatus (e.g., a tablet terminal) has been used as an example of the information processing apparatus 3. Alternatively, the information processing apparatus 3 may be a handheld apparatus or a portable apparatus larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

In addition, the vibration signal generation program may be supplied to the information processing apparatus 3 not only through an external storage medium such as the external memory 45, but also through a wired or wireless communication link. Further, the vibration signal generation program may be stored in advance in a non-volatile storage device included in the information processing apparatus 3. It should be noted that examples of an information storage medium having stored therein the vibration signal generation program may include CD-ROMs, DVDs, optical disk storage media similar to these, flexible disks, hard disks, magneto-optical disks, and magnetic tapes, as well as non-volatile memories. Alternatively, an information storage medium having stored therein the vibration signal generation program may be a volatile memory for storing the vibration signal generation program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a vibration signal generation program, a vibration generation apparatus, a vibration generation system, a vibration signal generation method, and the like in order, for example, to generate a vibration signal for outputting a vibration rich in variety.

What is claimed is:

1. A non-transitory computer-readable storage medium having stored therein a vibration signal generation program to be executed by a computer included in a vibration signal generation apparatus for generating a vibration signal in accordance with execution of an application, the vibration signal generation program causing the computer to execute:
    acquiring a predetermined parameter during the execution of the application;

setting a predetermined algorithm indicating at least timing and intensity for generating a vibration, by dynamically changing the predetermined algorithm in accordance with the parameter acquired in the acquisition of the predetermined parameter; and generating a vibration signal using a material for a vibration or a sound and the algorithm set in the setting of the predetermined algorithm, or using a filter capable of generating the material and the algorithm set in the setting of the predetermined algorithm, wherein in the setting of the predetermined algorithm, the algorithm is set by, in accordance with the parameter acquired in the acquisition of the predetermined parameter, calculating intensity of each vibration, a time interval for generating each vibration, a time width of generation of each vibration, and/or randomness of each vibration.

2. The non-transitory computer-readable storage medium having stored therein the vibration signal generation program according to claim 1, the vibration signal generation program further causing the computer to execute generating a sound signal using the same algorithm set in the setting of the predetermined algorithm.

3. The non-transitory computer-readable storage medium having stored therein the vibration signal generation program according to claim 2, the vibration signal generation program further causing the computer to execute approximately simultaneously outputting a vibration indicating the vibration signal generated in the generation of the vibration signal and a sound indicating the sound signal generated in the generation of the sound signal.

4. The non-transitory computer-readable storage medium having stored therein the vibration signal generation program according to claim 2, wherein in the generation of the vibration signal, the vibration signal is generated using a first material for a vibration or a sound and the algorithm set in the setting of the predetermined algorithm, or using a filter capable of generating the first material and the algorithm set in the setting of the predetermined algorithm, and in the generation of the sound signal, the sound signal is generated using a second material for a sound different from the first material and the same algorithm, or using a filter capable of generating the second material and the same algorithm.

5. The non-transitory computer-readable storage medium having stored therein the vibration signal generation program according to claim 2, wherein in the generation of the vibration signal, the vibration signal is generated using the filter capable of generating the material and the algorithm set in the setting of the predetermined algorithm, and in the generation of the sound signal, the sound signal is generated using the material and the same algorithm.

6. The non-transitory computer-readable storage medium having stored therein the vibration signal generation program according to claim 1, the vibration signal generation program further causing the computer to execute generating a sound signal using the same filter capable of generating the material.

7. The non-transitory computer-readable storage medium having stored therein the vibration signal generation program according to claim 1, wherein in the acquisition of the predetermined parameter, while an application for displaying a predetermined object on a display screen by placing the predetermined object in a virtual world is executed, a parameter regarding the object is acquired, and in the setting of the predetermined algorithm, the predetermined algorithm is changed in accordance with the parameter regarding the object.

8. The non-transitory computer-readable storage medium having stored therein the vibration signal generation program according to claim 7, wherein in the acquisition of the predetermined parameter, based on a physical simulation when the object is placed in the virtual world, the parameter regarding the object is acquired.

9. The non-transitory computer-readable storage medium having stored therein the vibration signal generation program according to claim 7, wherein in the acquisition of the predetermined parameter, a parameter representing a vibration generated by the object in the virtual world is acquired as the parameter regarding the object.

10. The non-transitory computer-readable storage medium having stored therein the vibration signal generation program according to claim 7, wherein in the acquisition of the predetermined parameter, based on a situation of the object in the virtual world, the parameter regarding the object is acquired.

11. The non-transitory computer-readable storage medium having stored therein the vibration signal generation program according to claim 1, wherein in the generation of the vibration signal, the vibration signal is generated using materials for a plurality of vibrations or materials for a plurality of sounds and the algorithm set in the setting of the predetermined algorithm.

12. The non-transitory computer-readable storage medium having stored therein the vibration signal generation program according to claim 1, wherein the filter includes at least one biquad filter.

13. The non-transitory computer-readable storage medium having stored therein the vibration signal generation program according to claim 1, the vibration signal generation program further causing the computer to execute changing a parameter for the filter in accordance with the parameter acquired in the acquisition of the predetermined parameter.

14. The non-transitory computer-readable storage medium having stored therein the vibration signal generation program according to claim 1, wherein the generation of the vibration signal includes generation of the material in real time in accordance with a result of the execution of the application.

15. The non-transitory computer-readable storage medium having stored therein the vibration signal generation program according to claim 1, wherein in the acquisition of the predetermined parameter, a first parameter can be acquired during execution of a first application, and a second parameter can be acquired during execution of a second application different from the first application, and in the setting of the predetermined algorithm, if the first parameter and the second parameter acquired in the acquisition of the predetermined parameter are the same as each other, the same algorithm is set.

16. The non-transitory computer-readable storage medium having stored therein the vibration signal generation program according to claim 1, wherein in the setting of the predetermined algorithm, a non-loop algorithm is set in accordance with the parameter acquired in the acquisition of the predetermined parameter, and in the generation of the vibration signal, a non-loop vibration signal is generated using the non-loop algorithm.

17. The non-transitory computer-readable storage medium having stored therein the vibration signal generation program according to claim 1, wherein
the material is waveform data of a band less than or equal to an upper limit frequency at which a user can recognize a vibration.

18. The non-transitory computer-readable storage medium having stored therein the vibration signal generation program according to claim 17, wherein
the material includes waveform data of a frequency range in which the user cannot hear a sound.

19. The non-transitory computer-readable storage medium having stored therein the vibration signal generation program according to claim 1, wherein
the filter includes a set of a plurality of filters in which a characteristic frequency less than or equal to an upper limit frequency at which a user can recognize a vibration is set.

20. The non-transitory computer-readable storage medium having stored therein the vibration signal generation program according to claim 19, wherein
the set of filters includes a filter in which a characteristic frequency belongs to a frequency range in which the user cannot hear a sound.

21. The non-transitory computer-readable storage medium according to claim 1, wherein the vibration signal generation program further causes the computer to transmit the generated vibration signal to a vibration generator for producing a vibration based on the generated vibration signal.

22. The non-transitory computer-readable storage medium according to claim 1, wherein the algorithm is set by calculating the intensity of each vibration, the time interval for generating each vibration, the time width of generation of each vibration, and the randomness of each vibration.

23. A non-transitory computer-readable storage medium having stored therein a vibration signal generation program to be executed by a computer included in a vibration signal generation apparatus for generating a vibration signal, the vibration signal generation program causing the computer to execute:
setting a predetermined algorithm indicating at least timing and intensity for generating a vibration;
dynamically changing the predetermined algorithm to calculated intensity of each vibration, a time interval for generating each vibration, a time width of generation of each vibration, and/or randomness of each vibration;
generating a vibration signal using a material for a vibration or a sound and the algorithm set in the setting of the predetermined algorithm, or using a filter capable of generating the material and the algorithm set in the setting of the predetermined algorithm; and
generating a sound signal using the same algorithm set in the setting of the predetermined algorithm.

24. The non-transitory computer-readable storage medium of claim 23, wherein the vibration signal generation program further causes the computer to execute:

transmitting the generated vibration signal to a vibration generator for producing a vibration based on the generated vibration signal; and
transmitting the generated sound signal to a sound generator for producing a sound based on the generated sound signal.

25. A vibration signal generation apparatus for generating a vibration signal in accordance with execution of an application, the vibration signal generation apparatus comprising a computer processor configured to:
acquire a predetermined parameter during the execution of the application;
set a predetermined algorithm indicating at least timing and intensity for generating a vibration, by dynamically changing the predetermined algorithm in accordance with the parameter acquired in the acquisition of the predetermined parameter; and
generate a vibration signal using a material for a vibration or a sound and the algorithm set in the setting of the predetermined algorithm, or using a filter capable of generating the material and the algorithm set in the setting of the predetermined algorithm,
wherein in the setting of the predetermined algorithm, the algorithm is set by, in accordance with the parameter acquired in the acquisition of the predetermined parameter, calculating intensity of each vibration, a time interval for generating each vibration, a time width of generation of each vibration, and/or randomness of each vibration.

26. A vibration signal generation system for generating a vibration signal in accordance with execution of an application, the vibration signal generation system comprising a computer processor configured to:
acquire a predetermined parameter during the execution of the application;
set a predetermined algorithm indicating at least timing and intensity for generating a vibration, by dynamically changing the predetermined algorithm in accordance with the parameter acquired in the acquisition of the predetermined parameter; and
generate a vibration signal using a material for a vibration or a sound and the algorithm set in the setting of the predetermined algorithm, or using a filter capable of generating the material and the algorithm set in the setting of the predetermined algorithm,
wherein in the setting of the predetermined algorithm, the algorithm is set by, in accordance with the parameter acquired in the acquisition of the predetermined parameter, calculating intensity of each vibration, a time interval for generating each vibration, a time width of generation of each vibration, and/or randomness of each vibration.

27. The vibration signal generation system of claim 26, further comprising a vibration generator for producing a vibration based on the generated vibration signal, and wherein the computer processor is further configured to control the generator to produce a vibration in accordance with the generated vibration signal.

28. The vibration signal generation system of claim 26, wherein the executed application controls display of an object, the vibration signal is generated using the sound and the set algorithm, and the sound is a sound associated with the object.

29. A vibration signal generation method to be executed by a processor or cooperation of a plurality of processors, the processor or the plurality of processors included in a vibration signal generation system for generating a vibration signal in accordance with execution of an application, the vibration signal generation method comprising:

acquiring a predetermined parameter during the execution of the application;

setting a predetermined algorithm indicating at least timing and intensity for generating a vibration, by dynamically changing the predetermined algorithm in accordance with the parameter acquired in the acquisition of the predetermined parameter; and generating a vibration signal using a material for a vibration or a sound and the algorithm set in the setting of the predetermined algorithm, or using a filter capable of generating the material and the algorithm set in the setting of the predetermined algorithm, wherein in the setting of the predetermined algorithm, the algorithm is set by, in accordance with the parameter acquired in the acquisition of the predetermined parameter, calculating intensity of each vibration, a time interval for generating each vibration, a time width of generation of each vibration, and/or randomness of each vibration.

* * * * *